(12) United States Patent
Kim et al.

(10) Patent No.: US 9,998,576 B2
(45) Date of Patent: Jun. 12, 2018

(54) ELECTRONIC DEVICE INCLUDING ANTENNA

(71) Applicant: Samsung Electronics Co., Ltd., Gyeonggi-do (KR)

(72) Inventors: Ho Saeng Kim, Gyeonggi-do (KR); Sang Youn Lee, Gyeonggi-do (KR); Young Sik Choi, Gyeonggi-do (KR); Seung Min Choi, Gyeonggi-do (KR); Seung Jun Hyun, Seoul (KR); Seung Nyun Kim, Incheon (KR); Dong Il Son, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days. days.

(21) Appl. No.: 15/491,657

(22) Filed: Apr. 19, 2017

(65) Prior Publication Data

US 2017/0302771 A1    Oct. 19, 2017

(30) Foreign Application Priority Data

Apr. 19, 2016  (KR) .......................... 10-2016-0047343

(51) Int. Cl.
*H04M 1/00* (2006.01)
*H04M 1/02* (2006.01)
(Continued)

(52) U.S. Cl.
CPC .......... *H04M 1/0266* (2013.01); *H01Q 1/243* (2013.01); *H01Q 1/38* (2013.01);
(Continued)

(58) Field of Classification Search
None
See application file for complete search history.

(56) References Cited

U.S. PATENT DOCUMENTS

| 6,538,620 B2* | 3/2003 | Lin ........................ H01Q 1/245 343/700 MS |
| 7,612,725 B2 | 11/2009 | Hill et al. |

(Continued)

FOREIGN PATENT DOCUMENTS

JP    2015-525048    8/2015

OTHER PUBLICATIONS

International Search Report dated Jul. 28, 2017 issued in counterpart application No. PCT/KR2017/004200, 10 pages.

*Primary Examiner* — Tuan A Tran
(74) *Attorney, Agent, or Firm* — The Farrell Law Firm, P.C.

(57) ABSTRACT

Disclosed is an electronic device including a housing having a first surface, a second surface and a side surface, a touch screen display including a conductive plane substantially parallel with the first surface, a printed circuit board positioned between the touch screen display and the second surface substantially parallel with the conductive plane; a wireless communication circuit, and a side member forming at least a portion of the side surface, which includes a first elongated part surrounding at least a portion of the conductive plane and formed of a non-conductive material, and a second elongated part surrounding at least a portion of the printed circuit board, but no portion of the conductive plane, and extending in parallel with the first elongated part. The second elongated part is formed of a conductive material, and is electrically coupled to the wireless communication circuit.

20 Claims, 21 Drawing Sheets

(51) Int. Cl.
  *H01Q 1/24* (2006.01)
  *H01Q 1/38* (2006.01)
  *H04B 1/40* (2015.01)

(52) U.S. Cl.
  CPC ............ *H04B 1/40* (2013.01); *H04M 1/0277* (2013.01); *H01Q 1/245* (2013.01); *H04M 2250/22* (2013.01)

(56) References Cited

U.S. PATENT DOCUMENTS

| | | | |
|---|---|---|---|
| 7,843,396 | B2 | 11/2010 | Hill et al. |
| 7,924,231 | B2 | 4/2011 | Hill et al. |
| 8,102,319 | B2 | 1/2012 | Schlub et al. |
| 8,169,374 | B2 | 5/2012 | Hill et al. |
| 8,259,017 | B2 | 9/2012 | Schlub et al. |
| 8,260,385 | B2 | 9/2012 | Kim et al. |
| 8,648,752 | B2* | 2/2014 | Ramachandran ........ H01Q 1/24 343/700 MS |
| 8,665,164 | B2* | 3/2014 | Hill ........................ H01Q 1/243 343/702 |
| 8,686,297 | B2* | 4/2014 | Shiu ........................ H05K 1/028 174/250 |
| 8,907,852 | B2 | 12/2014 | Hill et al. |
| 9,065,175 | B2* | 6/2015 | Corbin ................... H01Q 1/243 |
| 9,356,355 | B2 | 5/2016 | Hill et al. |
| 9,413,080 | B2 | 8/2016 | Park et al. |
| 9,673,507 | B2* | 6/2017 | Ramachandran ...... H01Q 1/243 |
| 2008/0316115 | A1 | 12/2008 | Hill et al. |
| 2009/0256758 | A1 | 10/2009 | Schlub et al. |
| 2010/0007564 | A1 | 1/2010 | Hill et al. |
| 2010/0123632 | A1* | 5/2010 | Hill ........................ H01Q 1/243 343/702 |
| 2011/0050513 | A1 | 3/2011 | Hill et al. |
| 2011/0165915 | A1 | 7/2011 | Kim et al. |
| 2011/0183721 | A1 | 7/2011 | Hill et al. |
| 2012/0046002 | A1 | 2/2012 | Hill et al. |
| 2012/0092221 | A1 | 4/2012 | Schlub et al. |
| 2012/0218723 | A1* | 8/2012 | Kwak ................... H01Q 1/243 361/748 |
| 2012/0299785 | A1* | 11/2012 | Bevelacqua ............. H01Q 9/42 343/702 |
| 2013/0127674 | A1* | 5/2013 | Korva ................... H01Q 1/243 343/702 |
| 2014/0049432 | A1 | 2/2014 | Hill et al. |
| 2014/0078008 | A1* | 3/2014 | Kang ....................... H01Q 5/35 343/702 |
| 2014/0111684 | A1* | 4/2014 | Corbin ................... H01Q 1/243 348/374 |
| 2014/0225787 | A1* | 8/2014 | Ramachandran ........ H01Q 1/24 343/702 |
| 2015/0123857 | A1 | 5/2015 | Park et al. |
| 2015/0145731 | A1* | 5/2015 | Jhang ................... H01Q 1/243 343/702 |
| 2016/0013543 | A1 | 1/2016 | Nguyen |
| 2016/0056530 | A1 | 2/2016 | Lee et al. |
| 2016/0164169 | A1* | 6/2016 | Krogerus ............... H01Q 21/28 343/702 |
| 2016/0248148 | A1 | 8/2016 | Hill et al. |
| 2016/0329629 | A1 | 11/2016 | Park et al. |

\* cited by examiner

ELECTRONIC DEVICE INCLUDING ANTENNA

PRIORITY

This application claims priority under 35 U.S.C. § 119(a) to a Korean Patent Application filed in the Korean Intellectual Property Office on Apr. 19, 2016 and assigned Serial Number 10-2016-0047343, the contents of which are incorporated herein by reference.

BACKGROUND

1. Field of the Disclosure

The present disclosure relates generally to an electronic device, and more particularly, to the structures of antennas resulting from the expansion of display panels in an electronic device.

2. Description of the Related Art

Recently, as mobile communication technologies have proliferated, electronic devices have evolved into portable structures for freely accessing wired/wireless communication networks. For example, portable electronic devices, such as smartphones or tablet personal computers (PCs), may access wireless communication networks by using antennas for transceiving wireless signals.

If the size of a display in the electronic device is increased, the space of the electronic device, in which the antenna is mounted, may be reduced, and a conductor included in the display may degrade the performance of the antenna.

For example, if a display panel including a conductor is adjacent to an antenna, the display panel may compromise the transmission or the reception of a signal through the antenna. In particular, if a display occupies most of a front surface of the electronic device, the performance of the antenna may be degraded by the display panel.

As such, there is a need in the art for an electronic device which minimizes the interference incurred by the antenna of the electronic device.

SUMMARY

Aspects of the present disclosure are provided to address at least the above-mentioned problems and/or disadvantages and to provide at least the advantages described below.

Accordingly, an aspect of the present disclosure is to provide an antenna structure capable of reducing an influence exerted as a display panel is expanded, and an electronic device including the same.

In accordance with an aspect of the present disclosure, an electronic device includes a housing including a first surface facing a first direction, a second surface facing a second direction opposite to the first direction, and a side surface surrounding a space between the first surface and the second surface, a touch screen display including a screen exposed through the first surface, wherein the touch screen display includes a conductive plane which is substantially parallel with the first surface, a printed circuit board positioned between the touch screen display and the second surface and being substantially parallel with the conductive plane, a wireless communication circuit positioned on the printed circuit board, and a side member forming at least a portion of the side surface, wherein the side member includes a first elongated part that surrounds at least a portion of the conductive plane and is formed of a non-conductive material, and a second elongated part surrounding at least a portion of the printed circuit board and substantially none of the conductive plane, and extending in parallel with the first elongated part, wherein the second elongated part is formed of a conductive material, and wherein the second elongated part is electrically coupled to the wireless communication circuit.

In accordance with another aspect of the present disclosure, an electronic device may include a glass cover configured to cover at least a portion of a front surface of the electronic device, a display panel disposed under the glass cover, a non-conductive member configured to cover at least a portion of a side surface of the electronic device, an antenna radiator configured to cover another portion of the side surface of the electronic device, a printed circuit board disposed under the display panel, and a wireless communication circuit disposed on the printed circuit board and electrically connected with the antenna radiator, wherein the non-conductive member is adjacent to the glass cover and is disposed to laterally surround at least a portion of the display panel, and wherein the antenna radiator is disposed under the non-conductive member, is spaced apart from the display panel in a layer-wise direction, and is electrically connected with the printed circuit board.

In accordance with another aspect of the present disclosure, an electronic device may include a glass cover configured to cover a front surface and at least a first portion of a side surface of the electronic device, a display panel disposed under the glass cover, an antenna radiator configured to cover a second portion of the side surface, a printed circuit board disposed under the display panel, and a wireless communication circuit disposed on the printed circuit board and electrically connected with the antenna radiator, wherein the antenna radiator is disposed under the glass cover, is spaced apart from the display panel in a layer-wise direction, and is electrically connected with the printed circuit board.

BRIEF DESCRIPTION OF THE DRAWINGS

The above and other aspects, features, and advantages of embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
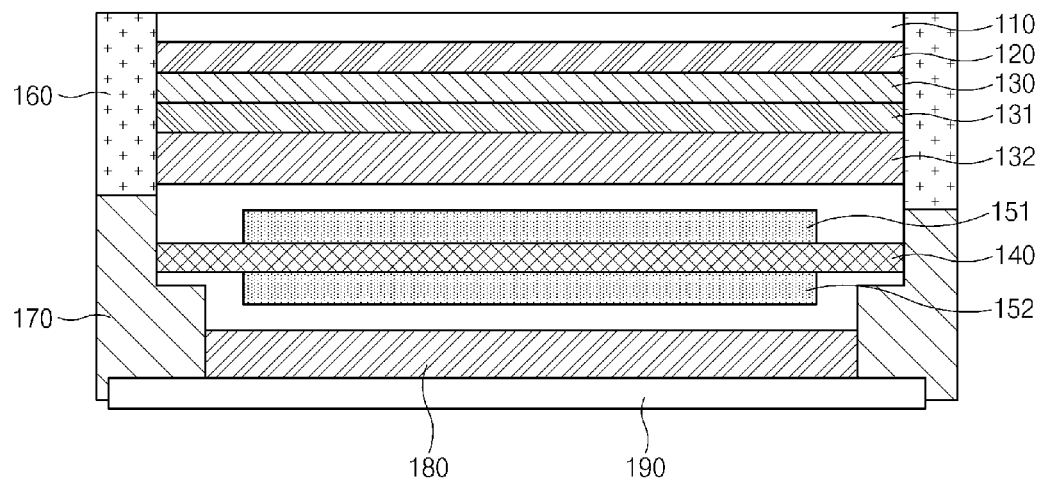
FIG. 1 illustrates a schematic sectional view of an electronic device, according to an embodiment of the present disclosure.

Hereinafter, embodiments of the present disclosure will be described with reference to accompanying drawings. Accordingly, those skilled in the art will recognize that modifications and equivalents of, and/or alternatives to the embodiments of the present disclosure can be made without departing from the scope and spirit of the present disclosure. Descriptions of well-known functions and/or configurations will be omitted for the sake of clarity and conciseness.

In the present disclosure, the expressions "have", "may have", "include" and "comprise", or "may include" and "may comprise" indicate existence of corresponding features, such as numeric values, functions, operations, or components, but do not exclude the presence of additional features.

In the present disclosure, the expressions "A or B", "at least one of A or/and B", or "one or more of A or/and B" may include all combinations of one or more of the associated listed items. For example, the expression "A or B", "at least one of A and B", or "at least one of A or B" may refer to any of (1) at least one A is included, (2) at least one B is included, and (3) at least one A and at least one B are included.

Terms such as "first" and "second" used in the present disclosure may be used to refer to different elements regardless of the order and/or the priority of the elements and to distinguish the relevant elements from other elements, but do not limit the elements. For example, "a first user device" and "a second user device" indicate mutually different user devices regardless of the order or the priority. For example, without departing the scope of the present disclosure, a first element may be referred to as a second element, and similarly, a second element may be referred to as a first element.

It will be understood that when an element, such as a first element, is referred to as being "(operatively or communicatively) coupled with/to" or "connected to" another element, such as a second element, the first element may be directly coupled with/to or connected to the second element or an intervening element, such as a third element, may be present. In contrast, when the first element) is referred to as being "directly coupled with/to" or "directly connected to" the second element, it should be understood that there is no intervening third element present.

According to the situation, the expression "configured to" used in the present disclosure may be used interchangeably with the expressions "suitable for", "having the capacity to", "designed to", "adapted to", "made to", or "capable of". The term "configured to" does not refer to only "specifically designed to" in hardware. Instead, the expression "a device configured to" may indicate that the device is "capable of" operating together with another device or other components. For example, a "processor configured to (or set to) perform A, B, and C" may indicate an embedded processor for performing a corresponding operation or a generic-purpose processor, such as a central processing unit (CPU) or an application processor, which executes corresponding operations by executing one or more software programs which are stored in a memory device.

Terms in the present disclosure are used to describe specified embodiments and are not intended to limit the scope of another embodiment. The terms of a singular form may include plural forms unless otherwise specified. All the terms used herein, which include technical or scientific terms, may have the same meaning that is generally understood by those skilled in the art in the present disclosure. It will be further understood that terms, which are used in the present disclosure and are commonly defined in a dictionary and commonly used, should also be interpreted as being customary in the relevant art and not in an idealized or overly formal unless expressly so defined in embodiments of the present disclosure. In some cases, even if certain terms are defined in the present disclosure, they may not be interpreted to exclude embodiments of the present disclosure.

An electronic device according to embodiments of the present disclosure may include at least one of smailphones, tablet personal computers (PCs), mobile phones, video telephones, e-book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. According to embodiments, the wearable device may include at least one of an accessory type, such as watches, rings, bracelets, anklets, necklaces, glasses, contact lens, or head-mounted-devices (HMDs), a fabric or garment-integrated type, such as electronic apparel, a body-attached type, such as a skin pad or tattoos, or a bio-implantable type, such as an implantable circuit.

According to embodiments, the electronic device may be a home appliance such as televisions (TVs), digital video disc (DVD) players, audios, refrigerators, air conditioners, cleaners, ovens, microwave ovens, washing machines, air cleaners, set-top boxes, home automation control panels, security control panels, TV boxes, such as Samsung HomeSync™, Apple TV™, or Google TV™, game consoles, such as Xbox™ and PlayStation™, electronic dictionaries, electronic keys, camcorders, and electronic picture frames.

According to another embodiment, an electronic device may include at least one of various medical devices, such as a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices, navigation devices, Global Navigation Satellite System (GNSS), event data recorders (EDRs), flight data recorders (FDRs), vehicle infotainment devices, electronic equipment for vessels, such as navigation systems and gyrocompasses, avionics, security devices, head units for vehicles, industrial or home robots, automatic teller machines (ATMs), point of sales (POSs) devices of stores, or Internet of things (IoT) devices, such as light bulbs, various sensors, electric or gas meters, sprinkler devices, fire alarms, thermostats, street lamps, toasters, exercise equipment, hot water tanks, heaters, and boilers.

According to an embodiment, the electronic device may include at least one of parts of furniture or buildings/structures, electronic boards, electronic signature receiving devices, projectors, or various measuring instruments, such as water meters, electricity meters, gas meters, or wave meters, and may be one of the above-described devices or a combination thereof. An electronic device according to an embodiment may be a flexible electronic device, but may not be limited to the above-described electronic devices and may include other electronic devices and new electronic devices according to the development of new technologies.

Hereinafter, an electronic device according to embodiments will be described with reference to accompanying drawings. In the present disclosure, the term "user" may be referred to as a person who uses an electronic device or an artificial intelligence electronic device which uses the electronic device.

FIG. 1 illustrates a schematic sectional view of an electronic device, according to an embodiment of the present disclosure.

Referring to FIG. 1, an electronic device 100 may include a glass cover 110, a touch panel 120, a display panel 130, a metallic sheet 131, a support member 132, a printed circuit board 140, shied cans 151 and 152, a non-conductive member 160, an antenna radiator 170, a dielectric layer 180, and a rear glass 190. FIG. 1 may be a longitudinal sectional view of the electronic device 100.

For example, the electronic device 100 may be one of various electronic devices 100, such as a smart phone, a tablet personal computer (PC), and a smart watch. The electronic device 100 may include a full front display which occupies the greater portion of a front surface of the electronic device 100. The electronic device 100 may make wireless communication by using the antenna radiator 170.

A housing of the electronic device 100 may include a first surface facing a first direction, a second surface facing a second direction opposite to the first direction, and a side surface which surrounds a space between the first surface and the second surface.

The first surface may include a first side having a first length, a second side having a second length longer than the first length, a third side having the first length, and a fourth side having the second length. The first side may be parallel with the third side and may be perpendicular to the second side and the fourth side.

The glass cover 110 may form the first surface of the housing, such as a front housing, and may be formed of a transparent material and a material for applying a touch input to the touch panel 120 through the glass cover. For example, the glass cover 110 may be tempered glass formed of a material such as an aluminum oxide.

The electronic device 100 may include a touch screen display including a screen exposed through the first surface. The touch screen display may include a conductive plane substantially parallel with the first surface. The conductive plane may include the touch panel 120.

The touch panel 120 may be disposed under the glass cover 110. If a user's finger makes contact with the touch panel 120, the touch panel 120 may sense the contact position with the user's finger. For example, the touch panel 120 may include a resistive, capacitive, or optical panel.

The display panel 130 may be disposed under the glass cover 110 and under the touch panel 120. For example, the display panel 130 may include a liquid crystal display (LCD), a light emitting diode (LED) display, an organic LED (OLED) display, a microelectromechanical systems (MEMS) display, or an electronic paper display.

The display panel 130 may occupy the front surface of the electronic device 100 at an occupancy rate higher than that of a typical panel. For example, the display panel 130 may occupy the entire portion of the front surface of the electronic device 100 except for the side surface of the housing of the electronic device 100. The display panel 130 may be formed of a conductive material. For example, if the display panel 130 is adjacent to an antenna as the display panel 130 is enlarged, the display panel 130 may affect the performance of the antenna.

Thus, the metallic sheet 131 may be disposed under the display panel 130. Specifically, if the display panel 130 is driven, an electromagnetic wave may be generated from the display panel 130 and may affect other configurations of the electronic device 100. For example, the electromagnetic wave may act as noise to the antenna of the electronic device 100. The metallic sheet 131 may suppress the electromagnetic waves generated downward from the display panel 130. The metallic sheet 131 may be formed of a material such as copper.

According to an embodiment, the support member 132 may be disposed under the metallic sheet 131, may support the touch panel 120, the display panel 130, and the metallic sheet 131, and may be formed of a dielectric or may include a conductor. If the support member 132 includes the conductor, the support member 132 and the metallic sheet 131 may be electrically connected with each other.

According to an embodiment, the printed circuit board 140 may be disposed under the display panel 130 and the support member 132. The printed circuit board 140 may be interposed between the display panel 130 (or a touch screen display) and the second face and may be disposed substantially parallel with the touch panel 120 (or a conductive plane). The printed circuit board 140 may be a flexible printed circuit board (FPCB).

The printed circuit board 140 may include a peripheral surface facing a fourth direction different from the first direction, the second direction, and a third direction. The fourth direction may be perpendicular to the first direction and the second direction and may be facing toward an outer portion of the electronic device 100. The peripheral surface of the printed circuit board 140 may be adjacent to the antenna radiator 170 in the fourth direction.

Various chips for operation of the electronic device 100 may be disposed on the printed circuit board 140, such as a wireless communication circuit which may be electrically connected with the antenna radiator 170.

The shield cans 151 and 152 may be disposed over and under the printed circuit board 140 and may suppress electromagnetic waves generated from chips disposed on the printed circuit board 140 to reduce the specific absorption rate (SAR) for a human head.

The electronic device 100 may include a side member that forms at least a portion of the side surface. The side member may extend along at least one of the first side or the third side and may include an inner surface facing the third direction different from the first direction and the second direction. The third direction may be perpendicular to the first direction and the second direction and may face toward an inner portion of the electronic device 100.

The electronic device 100 may include the non-conductive member 160 and the antenna radiator 170 forming at least a portion of a side housing of the electronic device 100 and being included in the side member.

The side member may include a first elongated part, such as the non-conductive member 160, surrounding at least a portion of the touch panel 120 (or the conductive plane). The first elongated part may be formed of a non-conductive material.

The non-conductive member 160 may be formed of an insulating material and in an injection molding manner.

The non-conductive member 160 may form at least a portion of the side housing of the electronic device 100 and may be adjacent to the glass cover 110. The non-conductive member 160 may physically contact the side surface of the glass cover 110. A top surface of the non-conductive member 160 and a top surface of the glass cover 110 may form a plane. The non-conductive member 160 may be disposed to laterally surround at least portions of the touch panel 120 and the display panel 130, and to physically contact the side surfaces of the touch panel 120 and/or the display panel 130. The non-conductive member 160 may be disposed to be spaced apart from the side surfaces of the touch panel 120 and/or the display panel 130 by a predetermined distance, and to laterally surround at least a portion of the metallic sheet 131 and the support member 132.

The distance between the display panel 130 and the antenna radiator 170 may be solidified by the non-conductive member 160 surrounding the display panel 130.

The side member may include a second elongated part, such as the antenna radiator 170, which surrounds at least a portion of the printed circuit board 140, such that no portion of the conductive plane is substantially surrounded by the second elongated part, and extends in parallel with the first elongated part. The second elongated part may be formed of a conductive material and may be electrically connected with the wireless communication circuit. The antenna radiator 170 may be formed of a conductive material and may be electrically connected with the wireless communication circuit. For example, the antenna radiator 170 may receive a radio frequency (RF) signal from the outside, and the received RF signal may be transmitted to the wireless communication circuit. Alternatively, the antenna radiator 170 may radiate an RF signal generated from the wireless communication circuit to the outside.

The antenna radiator 170 may form at least a portion of the side housing of the electronic device 100, may be disposed under the non-conductive member 160, may physically contact the non-conductive member 160 layer-wise (i.e., in the vertical direction in FIG. 1), and may be a layer spaced apart from the layer of display panel 130 since the antenna radiator 170 is disposed under the non-conductive member 160 surrounding the display panel 130.

For example, the antenna radiator 170 may be disposed to be electrically connected with one side surface of the printed circuit board 140, and to laterally surround the printed circuit board 140. The antenna radiator 170 may be electrically connected with the printed circuit board 140 through a conductive connecting member. For example, the antenna radiator 170 may physically contact the conductive connecting member disposed on the side surface of the printed circuit board 140.

According to an embodiment, when the display panel 130 occupies the largest portion of the front surface of the electronic device 100, the antenna radiator 170 may be adjacent to the display panel 130 formed of a conductive material. If the antenna radiator 170 is adjacent to the display panel 130, the display panel 130 may be disposed in the path where electrical signals are radiated from the antenna radiator 170 or are received to the antenna radiator 170. In this case, the display panel 130 may affect the electrical signals radiated from the antenna radiator 170 and to be received to the antenna radiator 170. Alternatively, if the antenna radiator 170 is adjacent to the display panel 130, noise generated by the display panel 130 may affect the antenna radiator 170. The antenna radiator 170 of the electronic device 100 is spaced apart from the display panel 130 layer-wise, thus limiting performance degradation of the antenna due to the display panel 130.

The dielectric layer 180 may be disposed under the printed circuit board 140. The dielectric layer 180 may be formed in a plate shape and may laterally physically contact the antenna radiator 170.

The rear glass 190 may be disposed under the dielectric layer 180, and may form the second surface of the housing, such as a rear housing.

Figure 2:
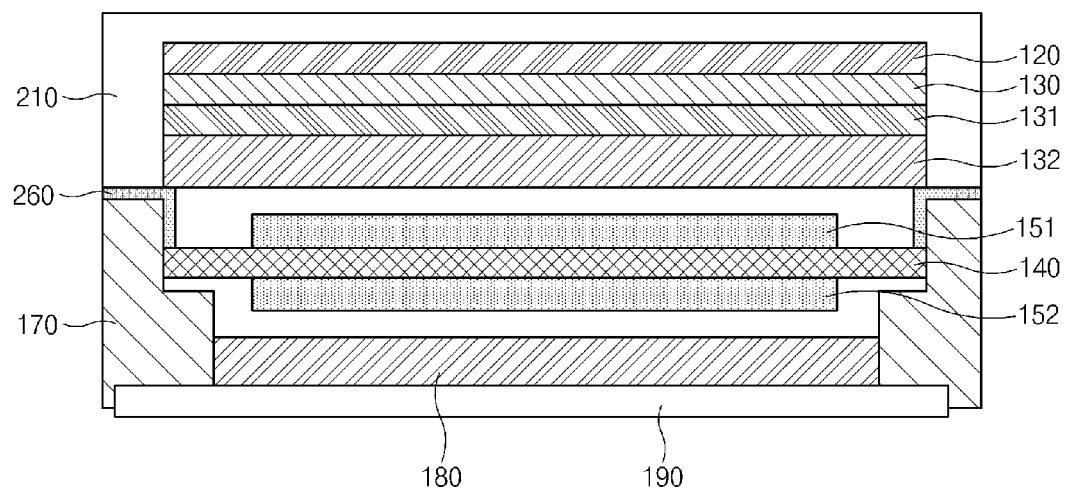
FIG. 2 illustrates a schematic sectional view of an electronic device, according to an embodiment of the present disclosure.

FIG. 2 illustrates a schematic sectional view of an electronic device, according to an embodiment of the present disclosure.

In FIG. 2, the glass cover 110 in FIG. 1 and the non-conductive member 160 in FIG. 1 of the electronic device may be formed integrally with each other. For example, the non-conductive member may be a portion of the glass cover.

Referring to FIG. 2, an electronic device may include a glass cover 210, the touch panel 120, the display panel 130, the metallic sheet 131, the support member 132, the printed circuit board 140, the shied cans 151 and 152, a buffer member 260, the antenna radiator 170, the dielectric layer 180 and the rear glass 190. FIG. 2 may illustrate a longitudinal-sectional view of the electronic device 100.

According to an embodiment, the glass cover 210 may form the front housing and at least a portion of the side housing of the electronic device. For example, the glass cover 210 may form an entire portion of the first surface and at least a portion of the side surface. The glass cover 210 may cover the first side and the third side, may be formed to surround the entire portion of a front surface and at least portions of side surfaces of the touch panel 120 and the display panel 130, and may be disposed to physically contact the front surface of the touch panel 120 or the display panel 130 to physically contact the side surfaces of the touch panel 120 and/or the display panel 130, to be spaced apart from the side surfaces of the touch panel 120 and/or the display panel 130 by a predetermined distance, and to laterally surround at least portions of the metallic sheet 131 and the support member 132.

The distance between the display panel 130 and the antenna radiator 170 may be solidified by the glass cover 210 formed to surround the display panel 130.

The touch panel 120 and the display panel 130 may be disposed under the glass cover 210. The side surfaces of the touch panel 120 and the display panel 130 may be adjacent to the glass cover 210

At least a portion of the display panel 130 may be curved, and at least a portion of the glass cover 210 may be curved along the display panel 130. The display panel 130 is formed in the shape of the curved surface, thereby enlarging the area of the display panel 130 and preventing the side surfaces of the touch panel 120, the display panel 130, the metallic sheet 131 and/or the support member 132 from being exposed to the outside through the side surface of the glass cover 210.

The antenna radiator 170 may be disposed under the glass cover 210. The antenna radiator 170 may be adjacent to the glass cover 210 layer-wise in the vertical direction in FIG. 2. Since the antenna radiator 170 is disposed under the glass cover 210 surrounding the display panel 130, the antenna radiator 170 may be spaced apart from the display panel 130 in the vertical direction, thereby preventing performance degradation of the antenna due to the display panel 130.

The buffer member 260 may be interposed between the glass cover 210 and the antenna radiator 170. The buffer member 260 may be formed of a material for protecting the glass cover 210. For example, if the glass cover 210 and the antenna radiator 170 formed of metal physically contact each other, the glass cover 210 may be damaged by impact applied to the glass cover 210. The buffer member 260 may be formed of an elastic material such that the glass cover 210 is not damaged when an impact is applied to the glass cover 210. The buffer member 260 may be formed of an insulating material such that electrical signals in the antenna radiator 170 are prevented from being transferred to other configurations. For example, the buffer member 260 may be formed in an L-shape, but the present disclosure is not limited thereto. For example, the buffer member 260 may be implemented in various shapes, such as an I-shape or a T-shape, as long as the buffer ember 260 is interposed between the glass cover 210 and the antenna radiator 170.

Figure 3A:
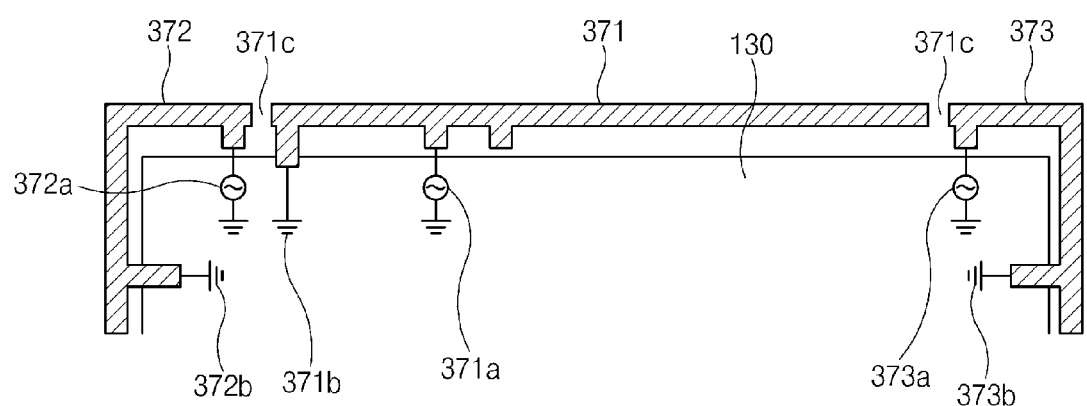
FIGS. 3A and 3B illustrate an antenna radiator at one end portion of an electronic device and a display panel, according to an embodiment of the present disclosure.
Figure 3B:
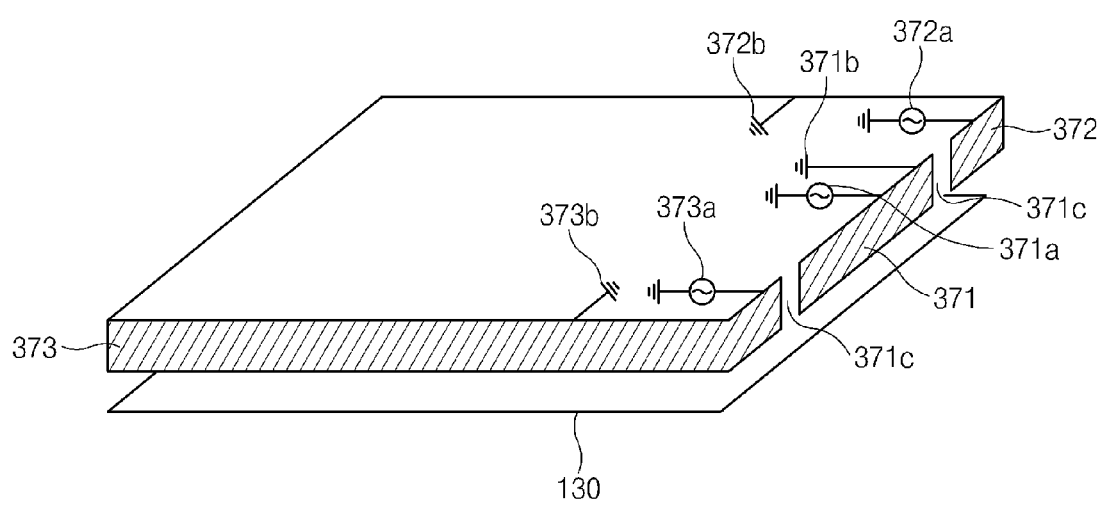

FIGS. 3A and 3B illustrate an antenna radiator at one end portion of an electronic device and a display panel, according to an embodiment of the present disclosure.

Referring to FIGS. 3A and 3B, an electronic device may include the display panel 130, a first radiator 371, a second radiator 372, and a third radiator 373. Each of the first radiator 371, the second radiator 372 and/or the third radiator 373 may transmit or receive various communication signals, such as a cellular communication signal ranging from about 0.6 GHz to about 2.7 GHz, a global positioning system (GPS) signal, such as having the frequency of about 1176.45 MHz, 1227.60 MHz, 1379.913 MHz, 1381.05 MHz, or 1575.42 MHz, a Wi-Fi signal, such as about 2.4 GHz or 5 GHz, or an NFC signal, such as about 13.56 MHz. For example, the first radiator 371 may transmit or receive a cellular communication signal in a low band, such as ranging from about 600 MHz to about 900 MHz, a middle band, such as ranging from about 1.7 GHz to about 2.1 GHz, or a high band, such as ranging from about 2.3 GHz to about 2.7 GHz.

The display panel 130 may be disposed to be spaced apart from each of the radiators 371, 372, and 373 layer-wise. Although FIG. 3A illustrates an empty space formed between the radiators 371, 372, 370 and the display panel 130, the present disclosure is not limited thereto. For example, a non-conductor may be filled in the space between the radiators 371, 372, and 370 and the display panel 130. The display panel 130 may be formed to be more adjacent to the radiators 371, 372, and 373 in a widthwise direction and a lengthwise direction as compared to that of a conventional panel. For example, if the display panel 130 is a full front display occupying the largest portion of the front surface of the electronic device, the display panel 130 may be disposed to be closer to the radiators 371, 372, and 373 and to overlap one or more flanges included in the radiators 371, 372, and 373.

According to an embodiment, the electronic device may include one or more slit parts 371c to segment the antenna radiator (or second elongated part) into the radiators 371, 372, and 373. Although FIGS. 3A and 3B illustrate that the slit parts are empty, the slit parts may include insulators.

Each of the radiators 371, 372, and 373 may be electrically connected with at least one feeding unit and/or at least one ground unit. For example, the first radiator 371 may be connected with a first feeding unit 371a and a first ground unit 371b, the second radiator 372 may be connected with a second feeding unit 372a and a second ground unit 372b, and the third radiator 373 may be connected with a third feeding unit 373a and a third ground unit 373b.

Each of the radiators 371, 372, and 373 may include a flange at a point connected with the feeding unit and the ground unit. For example, the flange (in particular, the flange connected with the feeding unit) may be of sufficient length to prevent the flange from overlapping the display in the widthwise and the lengthwise directions. Alternatively, although FIGS. 3A and 3B illustrate that the radiators 371, 372, and 373 include the flanges at the points connected with the feeding units, the radiators 371, 372, and 373 may not include the flange as illustrated in FIGS. 5 to 11.

According to embodiments, each of the first feeding unit 371a, the second feeding unit 372a and/or the third feeding unit 373a may transmit a communication signal, such as the communication signal generated from a communication circuit, to the radiators 371, 372, and 373. For example, each signal transmitted to the radiators 371, 372, and 373 may be transmitted to the first ground unit 371b, the second unit 372b and/or the third ground unit 373b. The communication circuit may be disposed on at least a portion of the printed circuit board 140 in FIG. 1, and may transmit or receive the communication signal through the radiators 371, 372, and 373.

The first radiator 371, the second radiator 372, and/or the third radiator 373 may be electrically connected with an element, such as a switch or a tuner, which may be controlled by a communication circuit or a communication processor. The resonant frequency of the first radiator 371, the second radiator 372 and/or the third radiator 373 may be changed by controlling the switch or the tuner.

Figure 4:
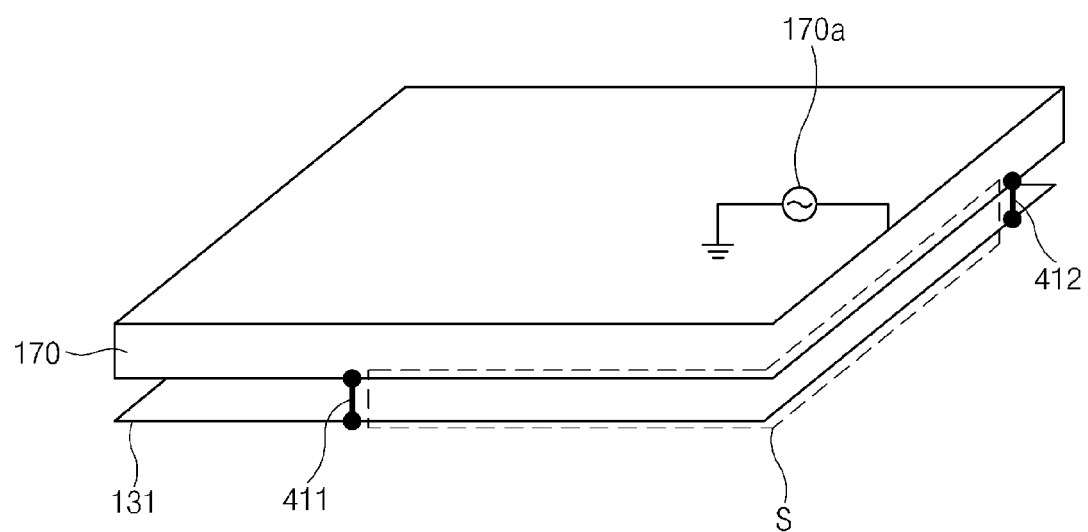
FIG. 4 illustrates an antenna radiator of an electronic device and a metallic sheet, according to an embodiment of the present disclosure.

FIG. 4 illustrates an antenna radiator of an electronic device and a metallic sheet, according to an embodiment of the present disclosure.

Referring to FIG. 4, an electronic device may include the antenna radiator 170, a feeding unit 170a, the metallic sheet 131, a first connecting member 411, and a second connecting member 412.

According to an embodiment, the first connecting member 411 may electrically connect the metallic sheet 131 with the antenna radiator 170 layer-wise. The first connecting member 411 may be formed of a conductive material, such as the C-clip.

The second connecting member 412 may electrically connect the metallic sheet 131 with the antenna radiator 170 at a position different from that of the first connecting member 411. For example, the second connecting member 412 may connect the metallic sheet 131 with the antenna radiator 170 on a side adjacent to a side including the position where the first connecting member 411 is disposed. The second connecting member 412 may connect the metallic sheet 131 with the antenna radiator 170 in the vertical direction. The second connecting member 412 may be formed of a conductive material. The second connecting member 412 may be the C-clip.

The metallic sheet 131, the first connecting member 411, the antenna radiator 170, and the second connecting member 412 may form an electrical path S where an RF signal is radiated or received. The electrical path S may operate as a slot antenna. The RF signal may flow along the electrical path S and may be radiated to or received from the outside through the electrical path S. For example, the RF signal generated by the feeding unit 170a may be radiated to the outside through the electrical path S. Since the metallic sheet 131 is spaced apart from the antenna radiator 170 layer-wise, the distance between the antenna radiator 170 and the metallic sheet 131 may be sufficiently solidified, and thus the internal area defined by the electrical path S may be solidified sufficiently to radiate or receive the RF signal.

Two points of the antenna radiator 170 and the metallic sheet 131, which are spaced apart from each other layer-wise, are electrically connected with each other and the distance between the antenna radiator 170 and the metallic sheet 131 is utilized, thereby implementing a slot antenna which improves the communication efficiency of the electronic device.

The antenna radiator 170 may be selectively connected with the metallic sheet 131. For example, the first connecting member 411 and/or the second connecting member 412 may include at least one switch. The antenna radiator 170 may be selectively connected with the metallic sheet 131 depending on the operation of the switch (switches) included in the first connecting member 411 and/or the second connecting member 412. When the slot antenna may be implemented when the first connecting member 411 and the second connecting member 412 electrically connect the antenna radiator 170 with the metallic sheet 131.

Figure 5:
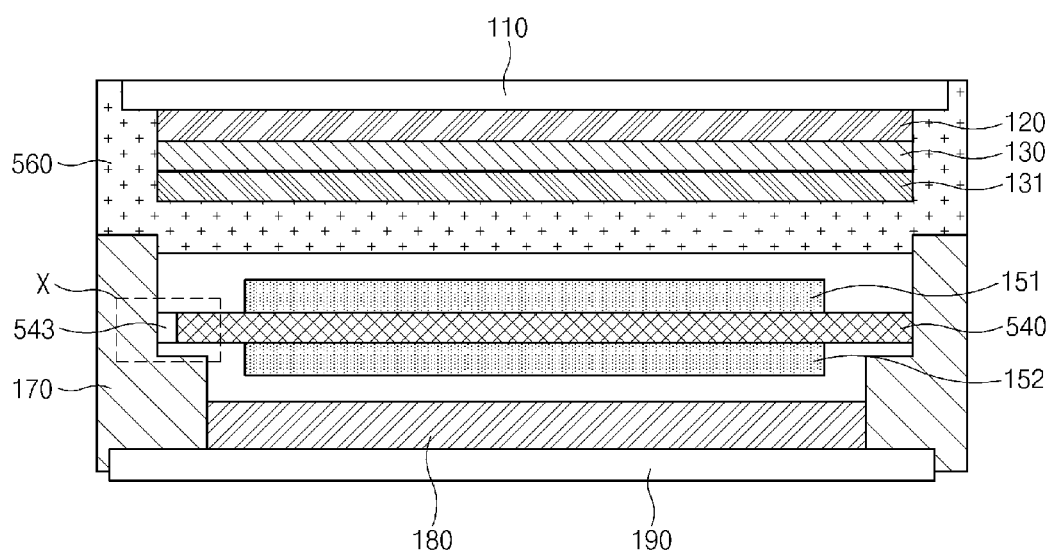
FIG. 5 illustrates a schematic sectional view of an electronic device, according to an embodiment of the present disclosure.
Figure 6:
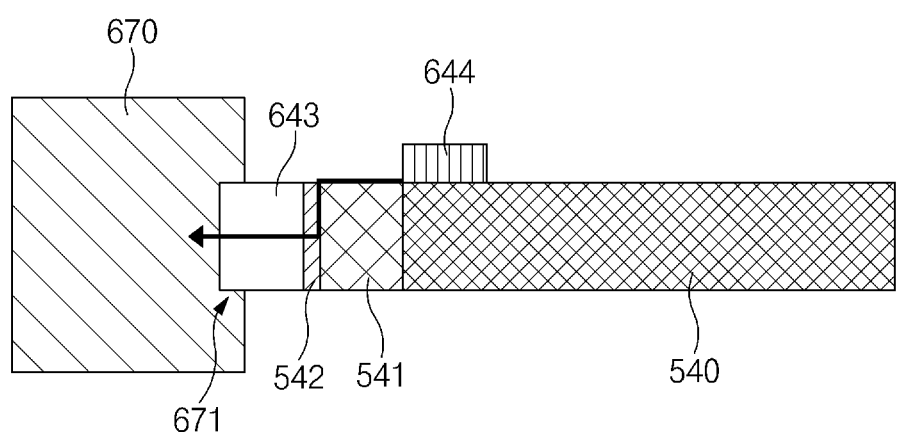
FIG. 6 illustrates an enlarged view of region "X" of FIG. 5 in an electronic device, according to an embodiment of the present disclosure.
Figure 7:
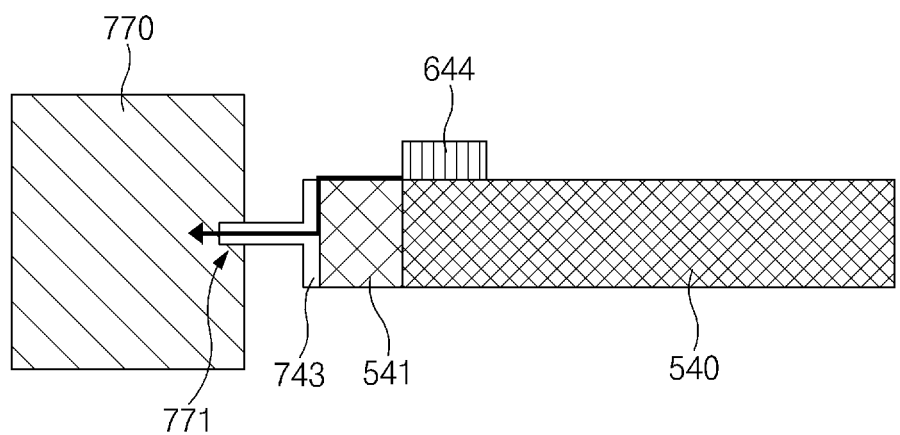
FIG. 7 illustrates an enlarged view of region "X" of FIG. 5 in an electronic device, according to an embodiment of the present disclosure.
Figure 8:
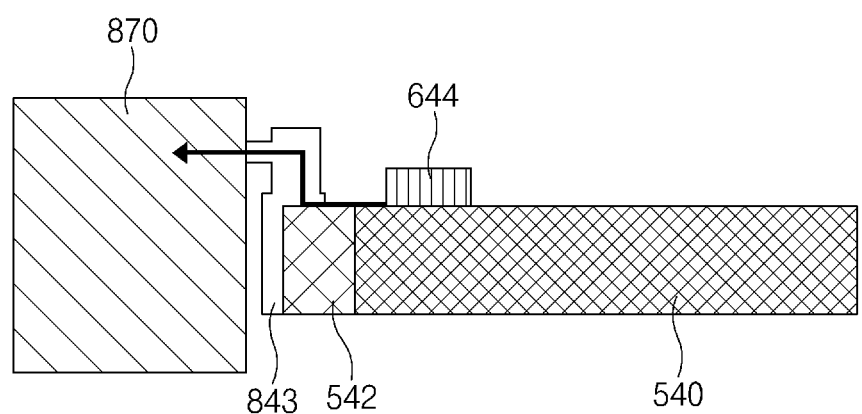
FIG. 8 illustrates an enlarged view of region "X" of FIG. 5 in an electronic device, according to an embodiment of the present disclosure.

FIG. 5 illustrates a schematic sectional view of an electronic device, according to an embodiment of the present disclosure. FIG. 6 illustrates an enlarged view of region "X" of FIG. 5 in an electronic device, according to an embodiment of the present disclosure. FIG. 7 illustrates an enlarged view of region "X" of FIG. 5 in an electronic device, according to an embodiment of the present disclosure. FIG. 8 illustrates an enlarged view of region "X" of FIG. 5 in an electronic device, according to an embodiment of the present disclosure.

Referring to FIG. 5, an electronic device 500 may include the glass cover 110, the touch panel 120, the display panel 130, the metallic sheet 131, a printed circuit board 540, a conductive connecting member 543, the shield cans 151 and 152, a non-conductive member 560, the antenna radiator 170, the dielectric layer 180, and the rear glass 190. FIG. 5 may be a longitudinal sectional view of the electronic device 500.

The non-conductive member 560 may be disposed under the metallic sheet 131. For example, the non-conductive member 560 may support the touch panel 120, the display panel 130, the metallic sheet 131, and the glass cover 110. In other words, the non-conductive member 560 may be formed in a structure capable of receiving the glass cover 110, the touch panel 120, the display panel 130, and the metallic sheet 131, in an internal space of the non-conductive member 560.

The non-conductive member 560 may form at least a portion of the side housing of the electronic device 500, may be adjacent to the glass cover 110, may physically contact the peripheral portions of the side surface and the rear surface of the glass cover 110, and may laterally surround at least portions of the touch panel 120, the display panel 130, and the metallic sheet 131. The non-conductive member 560 may be disposed to physically contact the side surfaces of the touch panel 120, the display panel 130 and/or the metallic sheet 131 and to be spaced apart from the side surface of the touch panel 120, the display panel 130 and/or the metallic sheet 131.

The antenna radiator 170 included in the electronic device 500 may be spaced apart from the display panel 130 in the horizontal and vertical directions. For example, when the electronic device 500 is viewed from the front, the antenna radiator 170 and the display panel 130 may not overlap each other. The antenna radiator 170 is spaced apart from the display panel 130 in the widthwise and the lengthwise directions. Accordingly, the signal radiated from the antenna radiator 170 toward the front surface of the electronic device 500 is not blocked by the display panel 130.

The electronic device 500 may include the conductive connecting member 543 electrically connected between an inner surface of the side member 170 and a peripheral surface of the printed circuit board 540, and at least one of a flexible conductive connector or a rigid conductive connector. The antenna radiator 170 may be electrically connected with a wireless communication circuit included in the printed circuit board 540 through the conductive connecting member 543 and may be fed with power through the wireless communication circuit which is electrically connected with the antenna radiator 170. The printed circuit board 540 may be an FPCB.

FIG. 6 illustrates an enlarged view of region "X" of FIG. 5 in an electronic device, according to an embodiment of the present disclosure. FIG. 7 illustrates an enlarged view of region "X" of FIG. 5 in an electronic device, according to an embodiment of the present disclosure. FIG. 8 illustrates an enlarged view of region "X" of FIG. 5 in an electronic device, according to an embodiment of the present disclosure.

Referring to FIG. 6, an electronic device may include the printed circuit board 540, a conductive connecting member 643, the matching circuit 644, and an antenna radiator 670.

According to an embodiment, one end portion of the printed circuit board 540 may include a fill-cut region 541, which is formed of an insulator. A lateral plating part 542 may be formed on the side surface of the fill-cut region 541. The matching circuit 644 may be disposed on the printed circuit board 540.

The antenna radiator 670 may include a groove 671 formed in a portion adjacent to the printed circuit board 540, and in a shape for receiving the conductive connecting member 643.

The conductive connecting member 643 may physically contact one side surface 542 of the printed circuit board 540 and may be inserted into the groove formed in the antenna radiator 670. The conductive connecting member 643 may be disposed on the electrical path between the wireless communication circuit and the antenna radiator 670. The conductive connecting member 643 may be a conductive tape. The conductive connecting member 643 may be attached to the lateral plating part 542 of the printed circuit board 540 and within the groove of the antenna radiator 670.

An RF signal may be transmitted to the antenna radiator 670 through the matching circuit 644, the lateral plating part 542, and the conductive connecting member 643. The RF signal is transmitted to the antenna radiator 670, which has no flange, through the conductive connecting member 643, thereby preventing the RF signal from being blocked by the display panel, when the display panel is expanded.

Alternatively, the antenna radiator 670 has the groove into which the conductive connecting member 643 is inserted, thereby preventing the RF signal radiated from the conductive connecting member 643 from being blocked by the display panel.

Referring to FIG. 7, an electronic device may include the printed circuit board 540, a conductive connecting member 743, the matching circuit 644, and an antenna radiator 770.

The antenna radiator 770 may include a groove formed in a portion adjacent to the printed circuit board 540, and in a shape for receiving one end portion of the conductive connecting member 743.

The conductive connecting member 743 may physically contact one side surface, such as the fill cut region 541, of the printed circuit board 540, may be inserted into the groove formed in the antenna radiator 770, and may be disposed on an electrical path between the wireless communication circuit and the antenna radiator 770.

The conductive connecting member 743 may include a first end portion making contact with the printed circuit board 540, and a second end portion making contact with the antenna radiator 770. In the conductive connecting member 743, an area of the second end portion may be narrower than an area of the first end portion. The conductive connecting member 743 may be formed in a T shape, and may be a clip-shape structure that may be mounted in the fill-cut area 541 of the printed circuit board 540 through a surface mounting technology (SMT). The first end portion of the conductive connecting member 743 may be mounted at the fill-cut region 541 and the second end portion may be inserted into the groove of the antenna radiator 770.

The RF signal may be transmitted to the antenna radiator 770 through the matching circuit 644 and the conductive connecting member 743.

Referring to FIG. 8, an electronic device may include the printed circuit board 540, a conductive connecting member 843, the matching circuit 644, and an antenna radiator 870.

The conductive connecting member 843 may physically contact the side surface and a portion of the front surface of the printed circuit board 540, such as the fill-cut region 542, and the antenna radiator 870. The conductive connecting member 843 may be mounted on the side surface and the portion of the front surface of the printed circuit board 540, such as the fill-cut region 542, through an SMT. For example, the conductive connecting member 843 may extend in the direction of the front surface (or first direction) from the side face and the portion of the front surface of the fill-cut region 542, and may extend in the direction (or a fourth direction), in which the antenna radiator 870 is disposed, from the end portion of the conductive connecting member 843 extending in the direction of the front surface. The conductive connecting member 843 may be disposed on the electrical path between the wireless communication circuit and the antenna radiator 870.

The length of the conductive connecting member 843 may be shorter than the lengths of the conductive connecting member 643 of FIG. 6 and the conductive connecting member 743 of FIG. 7. Alternatively, when the conductive connecting member 843 is used, the distance between the printed circuit board 540 and the antenna radiator 870 may be shorter than the distance between the printed circuit board 540 and the antenna radiator 670 when the conductive connecting member 643 of FIG. 6 is used or the distance between the printed circuit board 540 and the antenna radiator 770 when the conductive connecting member 743 of FIG. 7 is used.

When the printed circuit board 540 is electrically connected with the antenna radiator 870 by the conductive connecting member 843, the space occupied by the conductive connecting member 843 may be reduced. According to an embodiment, an RF signal, which may be radiated from the conductive connecting member 843, may be prevented from being blocked by the display panel even if the antenna radiator 870 has no groove.

The RF signal may be transmitted to the antenna radiator 870 through the matching circuit 644 and the conductive connecting member 843.

Figure 9:
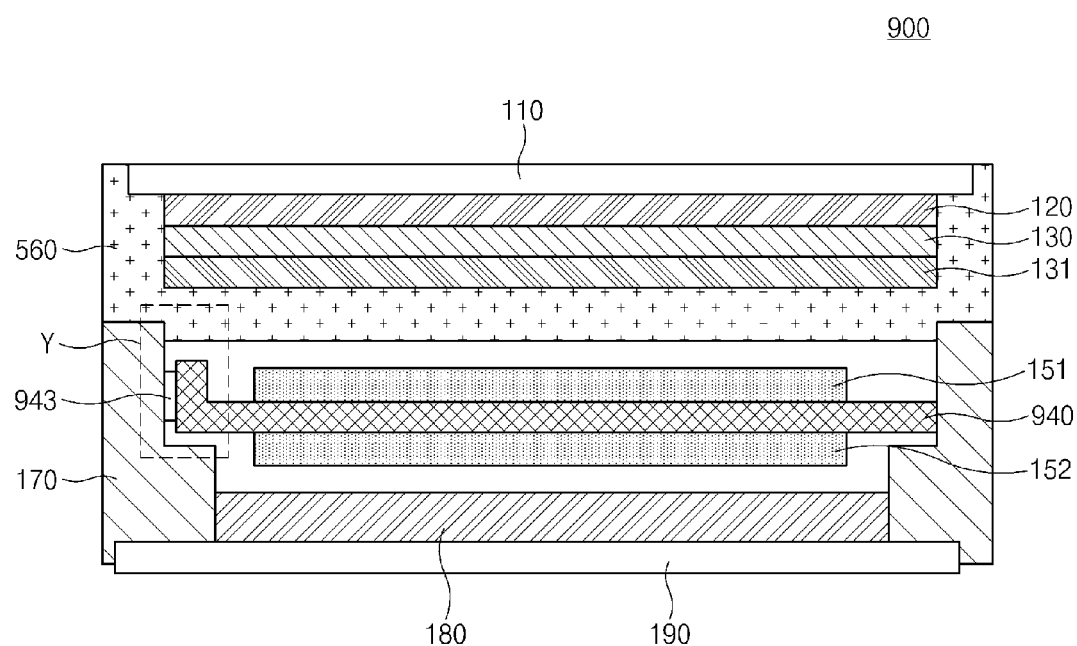
FIG. 9 illustrates a schematic sectional view of an electronic device, according to an embodiment of the present disclosure.
Figure 10:
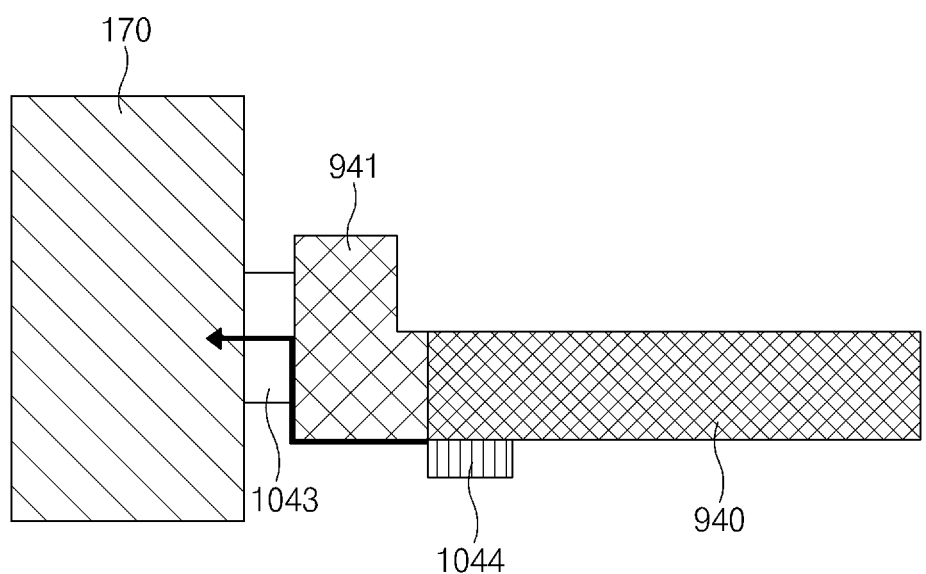
FIG. 10 illustrates an enlarged view of region "Y" of FIG. 9 in an electronic device, according to an embodiment of the present disclosure.
Figure 11:
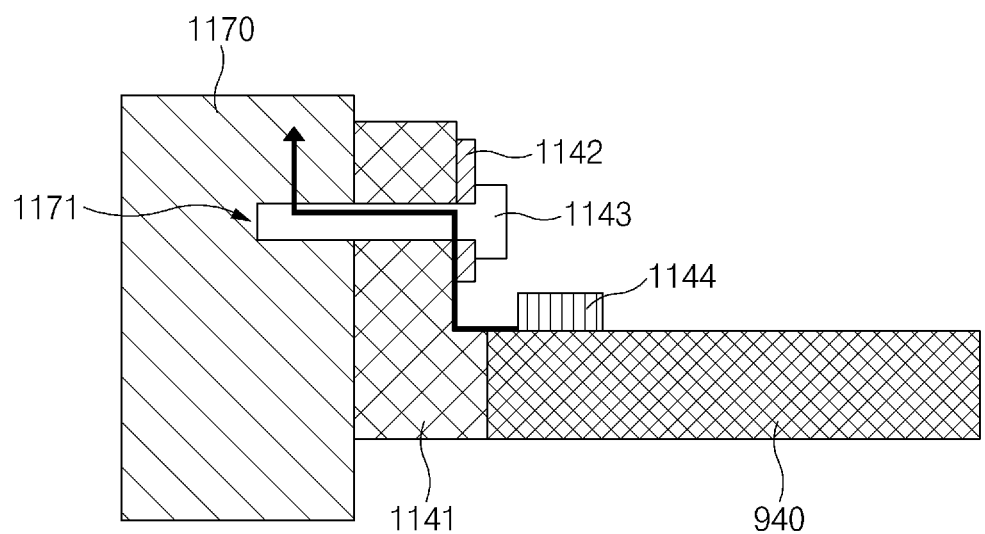
FIG. 11 illustrates an enlarged view of region "Y" of FIG. 9 in an electronic device, according to an embodiment of the present disclosure.

FIG. 9 illustrates a schematic sectional view of an electronic device, according to an embodiment of the present disclosure. FIG. 10 illustrates an enlarged view of region "Y" of FIG. 9 in an electronic device, according to an embodiment of the present disclosure. FIG. 11 illustrates an enlarged view of region "Y" of FIG. 9 in an electronic device, according to an embodiment of the present disclosure.

Referring to FIG. 9, an electronic device 900 may include the glass cover 110, the touch panel 120, the display panel 130, the metallic sheet 131, a printed circuit board 940, a conductive connecting member 943, the shield cans 151 and 152, the non-conductive member 560, the antenna radiator 170, the dielectric layer 180 and the rear glass 190. FIG. 9 may be a longitudinal sectional view of the electronic device 900.

The antenna radiator 170 included in the electronic device 900 may be spaced apart from the display panel 130 in the widthwise and lengthwise directions thereby preventing the signal radiated from the antenna radiator 170 toward the front surface of the electronic device 900 from being blocked by the display panel 130. For example, when the electronic device 900 is viewed from the front, the antenna radiator 170 and the display panel 130 may not overlap each other.

At least a portion of the printed circuit board 940 adjacent to the antenna radiator 170, such as a fill-cut region, may be formed in an L shape. Since the end portion of the printed circuit board 940 is formed in the L shape, the area of the portion adjacent to the antenna radiator 170 may be widened.

Although FIG. 9 illustrates that one end portion of the printed circuit board 940 is formed in the L shape, and the opposing end portion of the printed circuit board 940 is formed in the L shape, the present disclosure is not limited thereto. For example, the end portions of the printed circuit board 940 may be formed in various shapes, such as a T shape, as long as the area of the portion adjacent to the antenna radiator 170 may be widened.

The printed circuit board 940 may be FPCB and may be disposed inside the electronic device 900 such that at least a portion of the printed circuit board 940, such as one end portion, is bent in the L shape.

The conductive connecting member 943 may be electrically connected with the antenna radiator 170 and a wireless communication circuit included in the printed circuit board 940, may be mounted on an outer portion of the end portion of the printed circuit board 940 which is formed in the L shape, or on the side surface of the printed circuit board 940 through an SMT. The shape of the end portion of the printed circuit board 940 widens the area of a side surface of the printed circuit board 940. Accordingly, the conductive connecting member 943 may be easily mounted on the side surface of the printed circuit board 940 through SMT.

Referring to FIG. 10, an electronic device may include the printed circuit board 940, a conductive connecting member 1043, a matching circuit 1044, and the antenna radiator 170.

One end portion of the printed circuit board 940 may include a fill-cut region 941 formed of an insulator and in an L shape. Although FIG. 10 illustrates that the fill-cut region 941 is formed in the L shape, the present disclosure is not limited to thereto. For example, the fill-cut region 941 may be formed in various shapes, such as a T-shape, as long as the area of a side surface of the fill-cut region 941 is widened. The matching circuit 1044 may be disposed under the printed circuit board 940. For example, the printed circuit board 940 may be formed of a rigid material, may be an FPCB, and may be bent in an L shape.

The conductive connecting member 1043 may physically contact one side surface of the printed circuit board 940 and may physically contact an inner surface of the antenna radiator 170. The conductive connecting member 1043 may be a clip-shape structure that may be mounted on an outer side surface of the fill-cut area 941 through an SMT. The conductive connecting member 1043 may be a C-clip and may be disposed on the electrical path between the wireless communication circuit and the antenna radiator 170.

An RF signal may be transmitted from a communication circuit to the antenna radiator 170 through the matching circuit 1044 and the conductive connecting member 1043.

Since the area of the side surface of the printed circuit board 940 is widened depending on the shape of the fill-cut region 941 of the printed circuit board 940, various types of structures may be used as the conductive connecting member 1043.

Referring to FIG. 11, the electronic device may include the printed circuit board 940, an auxiliary connecting member 1142, a conductive connecting member 1143, a matching circuit 1144, and an antenna radiator 1170.

The conductive connecting member 1143 may be inserted into a groove 1171 formed in the antenna radiator 1170 through a fill-cut region 1141 of the printed circuit board 940. For example, the conductive connecting member 1143 may be a screw-type structure which may pass through the fill-cut region 1141, and may be disposed in the electrical path between the wireless communication circuit and the antenna radiator 1170. In this case, the matching circuit 1144 may be disposed on the printed circuit board 940.

The auxiliary connecting member 1142 may be interposed between the conductive connecting member 1143 and the fill-cut region 1141 of the printed circuit board 940, and may assist the coupling of the conductive connecting member 1143 and disperse the pressure applied to the fill-cut region 1141 by the conductive connecting member 1143. The auxiliary connecting member 1142 may be separately formed of a metallic material and may be integrated with the fill-cut region 1141 of the printed circuit board 940.

The RF signal may be transmitted to the antenna radiator 1170 through the matching circuit 1144 and the conductive connecting member 1143.

Since the area of the side surface of the printed circuit board 940 is widened depending on the shape of the fill-cut region 1141 of the printed circuit board 940, the printed circuit board 940 and the antenna radiator 1170 may be electrically connected with each other by the conductive connecting member 11143 formed in a screw-type structure.

Figure 12A:
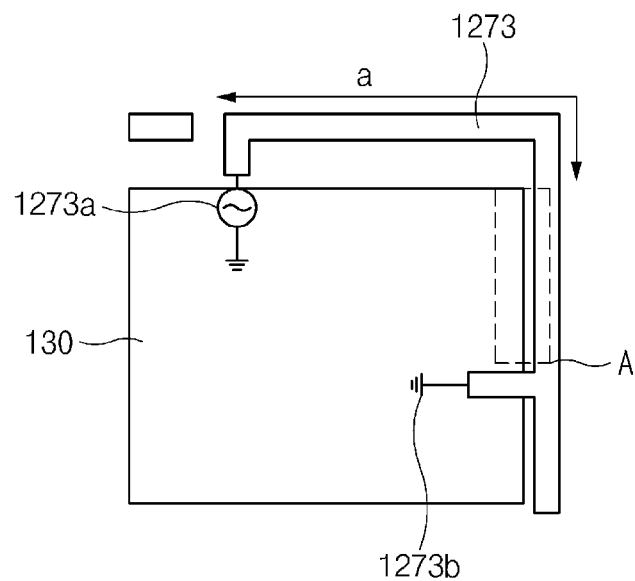
FIGS. 12A and 12B illustrate an antenna radiator at one end portion of an electronic device and a display panel, according to an embodiment of the present disclosure.
Figure 12B:
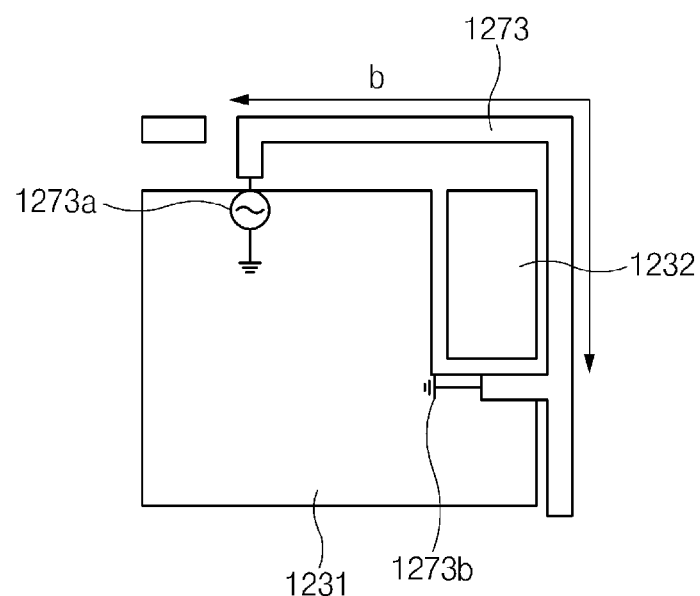

FIGS. 12A and 12B illustrate an antenna radiator at one end portion of an electronic device and a display panel, according to an embodiment of the present disclosure.

Referring to FIGS. 12A and 12B, the electronic device may include an antenna radiator 1273, a feeding unit 1273*a*, a ground unit 1273*b*, a first display panel 1231, and a second display panel 1232.

In FIG. 12A, the antenna radiator 1273 may be connected with the feeding unit 1273*a* and the ground unit 1273*b*. An RF signal may flow between the feeding unit 1273*a* and the ground unit 1273*b* of the antenna radiator 1273. For example, when the integrated-type display panel 130 is adopted, a parasitic capacitance may be generated between the antenna radiator 1273 and the display panel 130 at a portion, such as region A, where the display panel 130 and the antenna radiator 1273 is adjacent to each other. In this case, the RF signal of the antenna radiator 1273 may be discharged to the display panel 130. Accordingly, the length of the antenna radiator 1273 may be substantially shortened, and the antenna radiator 1273 may have a resonant frequency corresponding to the length of an electrical path A.

In FIG. 12B, the electronic device may include the first display panel 1231 (or a first area) and the second display panel 1232 (a second area). The area of the first display panel 1231 may be wider than the area of the second display panel 1232. The second display panel 1232 may be formed in the shape extending along a portion, which is shorter than a specified distance from the second display panel 1232, of the electrical path between the feeding unit 1273*a* and the ground unit 1273*b*. For example, the second display panel 1232 may be formed in a rectangular shape extending along the region A.

Although FIG. 12B illustrates that the second display panel 1232 is formed in the rectangular shape at the top-right of the electronic device, the present disclosure is not limited thereto, and the second display panel 1232 may be formed in other shapes, such as a polygon or circular shape. In addition, the second display panel 1232 may be disposed in various positions, such as left top, bottom-left, and bottom-right. The first display panel 1231 and the second display panel may be electrically insulated from each other, such that a driving circuit of the first display panel 1231 and a driving circuit of the second display panel 1232 may be implemented separately from each other.

According to an embodiment, when the area of the second display panel 1232 is narrower than a specified area, the parasitic capacitance in the region A may be reduced or eliminated. For example, the widthwise length of the second display panel 1232 may be about 2 mm, and the lengthwise length may be in the range of about 7 mm to about 8 mm.

As described above, the display panel 130 is divided into the first display panel 1231 and the second display panel 1232, thereby reducing or eliminating the parasitic capacitance which may be generated in the region A. In this case, the RF signal of the antenna radiator 1273 may not be discharged to the second display panel 1232. Thus, the antenna radiator 1273 may have a resonant frequency corresponding to the length of the intended electrical path b in design.

Although FIGS. 12A and 12B illustrate that the display panel 130 is divided into the first display panel 1231 and the second display panel 1232, the touch panel 120 may also be divided into two parts similarly to the display panel 130.

An electronic device may include a housing including a first surface facing a first direction, a second surface facing a second direction opposite to the first direction, and a side surface which surrounds a space between the first surface and the second surface, a touch screen display including a screen, which is exposed through the first surface, and a conductive plane which is substantially parallel with the first surface, a printed circuit board interposed between the touch screen display and the second surface and substantially parallel with the conductive plane, a wireless communication circuit positioned on the printed circuit board, and a side member forming at least a portion of the side surface.

The side member may include a first elongated part surrounding at least a portion of the conductive plane and formed of a non-conductive material, and a second elongated part surrounding at least a portion of the printed circuit board, extending in parallel with the first elongated part, formed of a conductive material, and electrically connected with the wireless communication circuit, no portion of the conductive plane being substantially surrounded by the second elongated part.

The first surface may include a first side having a first length, a second side having a second length longer than the first length, a third side having the first length, and a fourth side having the second length. The first side may be parallel with the third side and may be perpendicular to the second side and the fourth side. The side member may extend along at least one of the first side and the third side.

The side member may include an inner surface facing a third direction different from a first direction and a second direction. The printed circuit board may include a peripheral surface facing a fourth direction different from the first direction, the second direction, and a third direction. The electronic device may further include a conductive connecting member electrically connected between the inner surface of the side member and the peripheral surface of the printed circuit board.

The conductive connecting member may include at least one of a flexible conductive connector or a rigid conductive connector.

The conductive plane may include a touch sensing panel.

The electronic device may further include one or more slit parts which segment a portion of the second elongated part surrounding a top end or a bottom end of the electronic device, and are adjacent to the first elongated part in a thickness direction of the electronic device.

An electronic device may include a glass cover covering at least a portion of a front surface of the electronic device, a display panel disposed under the glass cover, a non-conductive member and an antenna radiator covering at least a portion of a side surface of the electronic device, a printed circuit board disposed under the display panel, and a wireless communication circuit disposed on the printed circuit board and electrically connected with the antenna radiator.

The non-conductive member may be adjacent to the glass cover and may be disposed to laterally surround at least a portion of the display panel.

The antenna radiator may be disposed under the non-conductive member, may be spaced apart from the display panel in a thickness direction, and may be electrically connected with one side surface of the printed circuit board.

The glass cover may be formed integrally with the non-conductive member.

The electronic device may further include a buffer member interposed between the non-conductive member and the antenna radiator.

The electronic device may further include one or more slit parts which segment the antenna radiator into a plurality of radiators. Each of the plural of radiators may be electrically connected with at least one feeding unit and at least one ground unit.

The electronic device may further include a metallic sheet disposed under the display panel, a first connecting member electrically connecting the metallic sheet with the antenna radiator, and a second connecting member electrically connecting the metallic sheet with the antenna radiator at a position different from a position of the first connecting member. The metallic sheet, the first connecting member, the antenna radiator, and the second connecting member may form an electrical path for radiating or receiving an RF signal.

The antenna radiator may be spaced apart from the display panel in a widthwise direction and a lengthwise direction.

The electronic device may further include a conductive connecting member making contact with the printed circuit board and inserted into a groove formed in a portion of the antenna radiator, which is adjacent to the printed circuit board. The conductive connecting member may be disposed on an electrical path between the wireless communication circuit and the antenna radiator.

The conductive connecting member may include a first end portion making contact with the printed circuit board and a second end portion making contact with the antenna radiator, and an area of the second end portion may be narrower than an area of the first end portion.

At least a portion of the printed circuit board adjacent to the antenna radiator may have an L shape. The electronic device may further include a conductive connecting member making contact with the printed circuit board and making contact with an inner surface of the antenna radiator. The conductive connecting member may be disposed on an electrical path between the wireless communication circuit and the antenna radiator.

The printed circuit board may laterally physically contact the antenna radiator. At least a portion of the printed circuit board adjacent to the antenna radiator may have an L shape. The electronic device may further include a conductive connecting member inserted into a groove formed in the antenna radiator through the printed circuit board. The conductive connecting member may be disposed on an electrical path between the wireless communication circuit and the antenna radiator.

The antenna radiator may be electrically connected with a feeding unit and a ground unit. The display panel may include a first region and a second region. An area of the first region may be wider than an area of the second region. The second region may extend along a portion, which is a specified distance from the second display panel, of the electrical path between the feeding unit and the ground unit.

An electronic device may include a glass cover covering a front surface and at least a portion of a side surface of the electronic device, a display panel disposed under the glass cover, an antenna radiator covering another portion of the side surface, a printed circuit board disposed under the display panel, and a wireless communication circuit disposed on the printed circuit board and electrically connected with the antenna radiator. The antenna radiator may be disposed under the glass cover, may be spaced apart from the display panel in a thickness direction, and may be electrically connected with one side surface of the printed circuit board.

The electronic device may further include a buffer member interposed between the glass cover and the antenna radiator.

The display panel may be curved, and the glass cover may be curved along the display panel.

Figure 13:
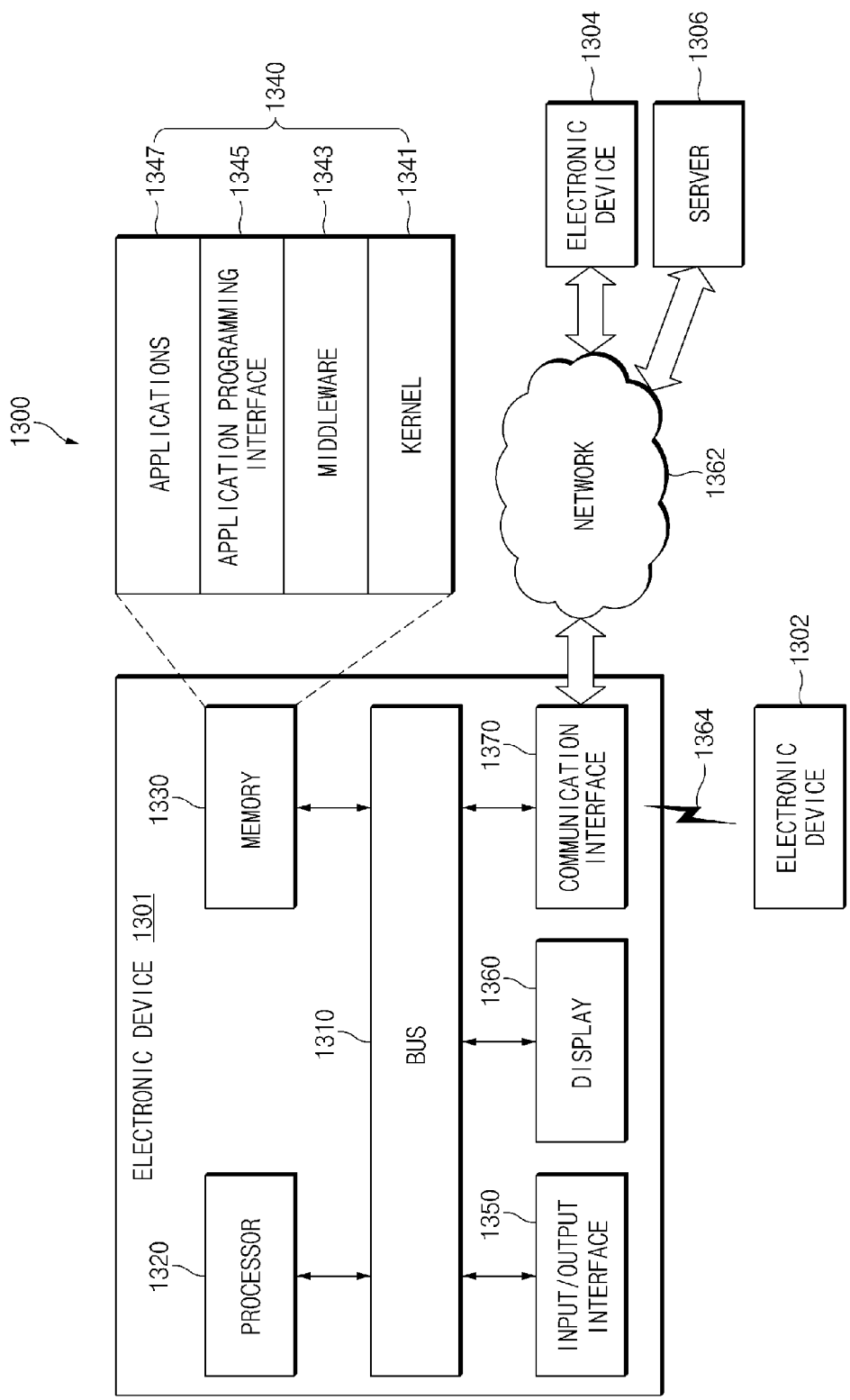
FIG. 13 illustrates a block diagram of an electronic device in a network environment, according to embodiments of the present disclosure.

FIG. 13 illustrates a block diagram of an electronic device in a network environment, according to embodiments of the present disclosure.

Referring to FIG. 13, an electronic device 1301 in a network environment 1300 may include a bus 1310, a processor 1320, a memory 1330, an input/output interface 1350, a display 1360, and a communication interface 1370. According to an embodiment, the electronic device 1301 may not include at least one of the above-described elements or may further include other element(s).

For example, the bus 1310 may interconnect the above-described elements 1310 to 1370 and may include a circuit for conveying communications, such as a control message and/or data, among the above-described elements.

The processor 1320 may include one or more of a central processing unit (CPU), an application processor (AP), or a communication processor (CP). For example, the processor 1320 may perform an arithmetic operation or data processing associated with control and/or communication of at least other elements of the electronic device 1301.

The memory 1330 may include a volatile and/or nonvolatile memory. For example, the memory 1330 may store instructions or data associated with at least one other element(s) of the electronic device 1301, and may store software and/or a program 1340. The program 1340 may include a kernel 1341, middleware 1343, an application programming interface (API) 1345, and/or application programs (or "applications") 1347. At least a part of the kernel 1341, the middleware 1343, or the API 1345 may be referred to as an OS.

For example, the kernel 1341 may control or manage system resources, such as the bus 1310, the processor 1320, and the memory 1330 that are used to execute operations or functions of other programs, such as the middleware 1343, the API 1345, and the applications 1347. The kernel 1341 may provide an interface that allows the middleware 1343, the API 1345, or the applications 1347 to access discrete elements of the electronic device 1301 so as to control or manage system resources.

The middleware 1343 may perform a mediation role such that the API 1345 or the applications 1347 communicate with the kernel 1341 to exchange data.

The middleware 1343 may process task requests received from the applications 1347 according to a priority. For example, the middleware 1343 may assign the priority, which enables use of a system resource of the electronic device 1301, to at least one of the applications 1347. For example, the middleware 1343 may process the one or more task requests according to the priority assigned to the at least one application 1347, which enables scheduling or load balancing to be performed on the one or more task requests.

The API 1345 may be an interface through which the applications 1347 control a function provided by the kernel 1341 or the middleware 1343, and may include at least one interface or function for file, or window control, image processing, or character control.

The input/output interface 1350 may transmit an instruction or data input from a user or another external device, to other element(s) of the electronic device 1301, and may output an instruction or data, received from other element(s) of the electronic device 1301, to a user or another external device.

The display 1360 may include a liquid crystal display (LCD), a light-emitting diode (LED) display, an organic LED (OLED) display, a microelectromechanical systems (MEMS) display, or an electronic paper display. The display 1360 may display various contents, such as a text, an image, a video, an icon, or a symbol, to a user. The display 1360 may include a touch screen and may receive a touch, gesture, proximity, or hovering input using an electronic pen or a part of a user's body.

For example, the communication interface 1370 may establish communication between the electronic device 1301 and an external device, such as the first external electronic device 1302, the second external electronic device 1304, or the server 1306. For example, the communication interface 1370 may be connected to the network 1362 over wireless communication or wired communication to communicate with the external device, such as the second external electronic device 1304 or the server 1306).

The wireless communication may use at least one of long-term evolution (LTE), LTE advanced (LTE-A), code division multiple access (CDMA), wideband CDMA (WCDMA), universal mobile telecommunications system (UMTS), wireless broadband (WiBro), or global system for mobile communications (GSM). The wireless communication may also include at least one of the short range communication 1364 such as wireless fidelity (Wi-Fi), Bluetooth, near field communication (NFC), magnetic stripe transmission (MST), or a global navigation satellite system (GNSS). The GNSS may include at least one of a global positioning system (GPS), a global navigation satellite system (Glonass), a Beidou navigation satellite system (Beidou), or a European global satellite-based navigation system (Galileo) based on an available region, or a bandwidth. Hereinafter, in the present disclosure, "GPS" and "GNSS" may be interchangeably used. The wired communication may include at least one of a universal serial bus (USB), a high definition multimedia interface (HDMI), a recommended standard-232 (RS-232), or a plain old telephone service (POTS). The network 1362 may include at least one of telecommunications networks, such as local area network (LAN) or a wide area network (WAN), the Internet, or a telephone network.

Each of the first and second external electronic devices 1302 and 1304 may be a device of which the type is different from or the same as that of the electronic device 1301. The server 1306 may include a group of one or more servers. According to embodiments, all or a portion of operations that the electronic device 1301 will perform may be executed by another or plural electronic devices 1302 and 1304 or the server 1306. When the electronic device 1301 executes any function or service automatically or in response to a request, the electronic device 1301 may not perform the function or the service internally, but, alternatively additionally, it may request at least a portion of a function associated with the electronic device 1301 at another device 1302 or 1304 or the server 1306, which may execute the requested function or additional function and may transmit the execution result to the electronic device 1301. The electronic device 1301 may provide the requested function or service using the received result or may additionally process the received result to provide the requested function or service. To this end, cloud computing, distributed computing, or client-server computing may be used.

Figure 14:
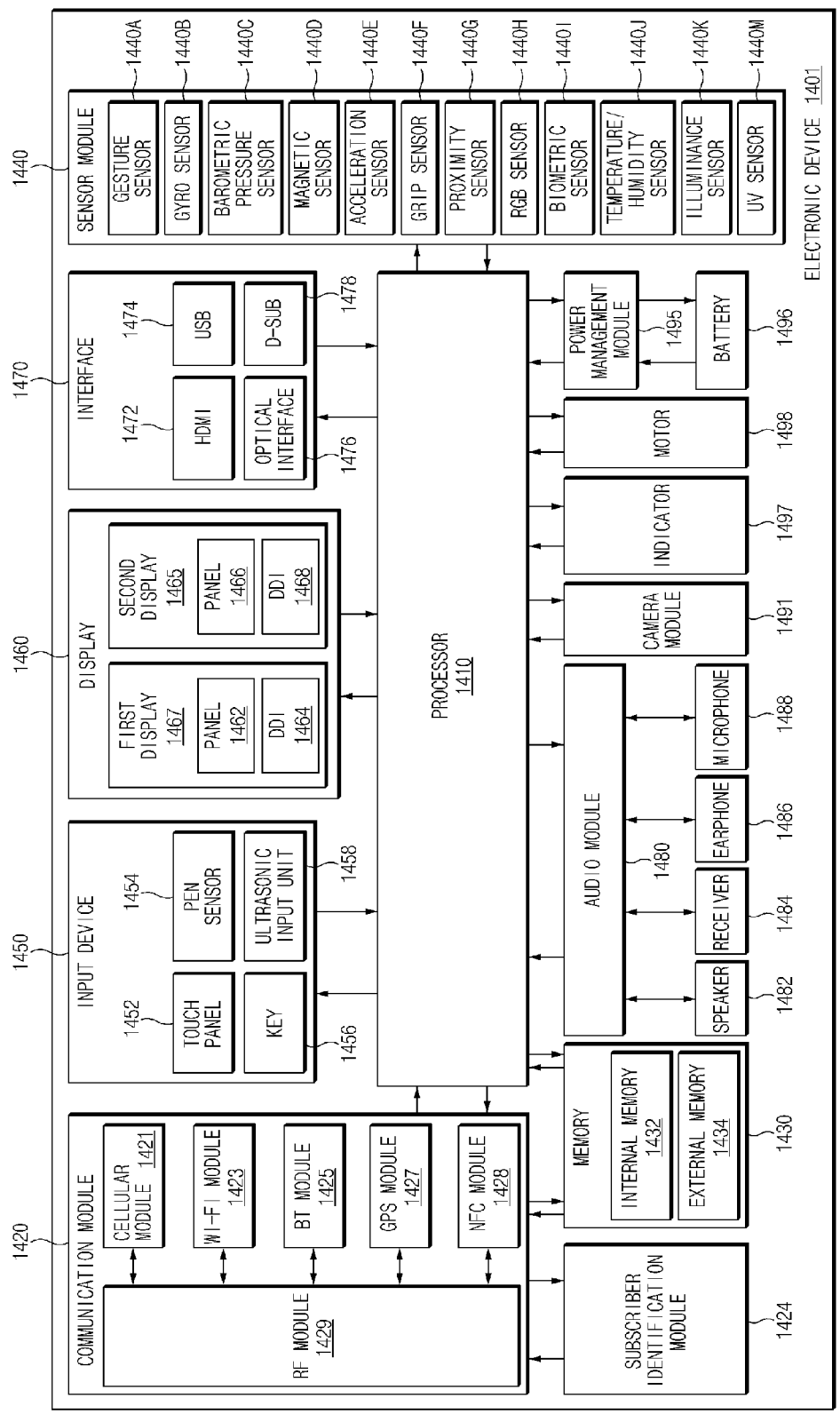
FIG. 14 illustrates a block diagram of an electronic device, according to embodiments of the present disclosure.

FIG. 14 illustrates a block diagram of an electronic device, according to embodiments of the present disclosure.

An electronic device 1401 may include all or a part of the electronic device 1301 illustrated in FIG. 13, including one or more processors, such as an application processor 1410, a communication module 1420, a subscriber identification module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498. The processor 1410 may drive an OS or an application to control a plurality of hardware or software elements connected to the processor 1410 and may process and compute a variety of data. For example, the processor 1410 may be implemented with a system on chip (SoC). According to an embodiment, the processor 1410 may further include a graphic processing unit (GPU) and/or an image signal processor. The processor 1410 may include at least a part of elements illustrated in FIG. 14, may load and process an instruction or data, which is received from at least one of other elements, such as a nonvolatile memory, and may store a variety of data in a nonvolatile memory.

The communication module 1420 may be configured the same as or similar to the communication interface 1370, and may include the cellular module 1421, a Wi-Fi module 1423, a Bluetooth (BT) module 1425, a GNSS module 1427, a near field communication (NFC) module 1428, and a radio frequency (RF) module 1429. The cellular module 1421 may provide voice communication, video communication, a character service, or an Internet service over a communication network. According to an embodiment, the cellular module 1421 may perform discrimination and authentication of the electronic device 1401 within a communication network by using the subscriber identification module (SIM) card 1424. The cellular module 1421 may perform at least a portion of functions that the processor 1410 provides. The cellular module 1421 may include a communication processor (CP). At least two of the cellular module 1421, the Wi-Fi module 1423, the BT module 1425, the GNSS module 1427, or the NFC module 1428 may be included within one integrated circuit (IC) or an IC package. For example, the RF module 1429 may transmit and receive an RF signal. For example, the RF module 1429 may include a transceiver, a power amplifier module (PAM), a frequency filter, a low noise amplifier (LNA), an antenna, or the like. According to another embodiment, at least one of the cellular module 1421, the Wi-Fi module 1423, the BT module 1425, the GNSS module 1427, or the NFC module 1428 may transmit and receive an RF signal through a separate RF module. The SIM card 1424 may include a card and/or embedded SIM that includes a SIM and may include unique identify information, such as integrated circuit card identifier (ICCID) or subscriber information, such as integrated mobile subscriber identity (IMSI).

The memory 1430 may include an internal memory 1432 or an external memory 1434. For example, the internal memory 1432 may include at least one of a volatile memory, such as a dynamic random access memory (DRAM), a static RAM (SRAM), or a synchronous DRAM (SDRAM)), a nonvolatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a flash memory, such as a NAND or a NOR flash memory), a hard drive, or a solid state drive (SSD). The external memory 1434 may include a flash drive such as compact flash (CF), secure digital (SD), micro secure digital (Micro-SD), mini secure digital (Mini-SD), extreme digital (xD), a multimedia card (MMC), or a memory stick. The external memory 1434 may be operatively and/or physically connected to the electronic device 1401 through various interfaces.

The sensor module 1440 may measure a physical quantity or may detect an operation state of the electronic device 1401. The sensor module 1440 may convert the measured or detected information to an electric signal. Generally or additionally, the sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, the proximity sensor 1440G, a color sensor 1440H, such as a red, green, blue (RGB) sensor, a biometric sensor 1440I, a temperature/humidity sensor 1440J, an illuminance sensor 1440K, or an ultraviolet (UV) sensor 1440M. Although not illustrated, additionally or generally, the sensor module 1440 may further include an E-nose sensor, an electromyography sensor (EMG) sensor, an electroencephalogram (EEG) sensor, an electrocardiogram (ECG) sensor, an infrared (IR) sensor, an iris sensor, and a fingerprint sensor. The sensor module 1440 may further include a control circuit for controlling at least one or more sensors included therein. According to an embodiment, the electronic device 1401 may further include a processor that is a part of or independent of the processor 1410 and is configured to control the sensor module 1440. The processor may control the sensor module 1440 while the processor 1410 remains in a sleep state.

The input device 1450 may include a touch panel 1452, a (digital) pen sensor 1454, a key 1456, and an ultrasonic input unit 1458. For example, the touch panel 1452 may use at least one of capacitive, resistive, infrared and ultrasonic detecting methods, and may further include a control circuit and a tactile layer to provide a tactile reaction to a user. The (digital) pen sensor 1454 may be a part of a touch panel or may include an additional sheet for recognition. The key 1456 may include a physical button, an optical key, or a keypad. The ultrasonic input device 1458 may detect (or sense) an ultrasonic signal, which is generated from an input device, through a microphone 1488 and may check data corresponding to the detected ultrasonic signal.

The display 1460 may include a panel, a hologram device, or a projector, and may be flexible, transparent or wearable. The panel and the touch panel may be integrated into a single module. The hologram device may display a stereoscopic image in a space using a light interference phenomenon. The projector may project light onto a screen so as to display an image. The screen may be arranged in the inside or the outside of the electronic device. According to an embodiment, the display 1460 may further include a control circuit for controlling the panel, the hologram device, or the projector.

A display may include a first display 1467 or a second display 1465. The first display 1467 may include a first panel 1462 and a first display drive IC (DDI) 1464 configured to control the first panel 1462, which may have a plurality of pixels that each include sub-pixels which display RGB representing three primary colors of light. Each of the sub-pixels may further include at least one transistor, and the pixels may be regulated based on the intensity of a voltage (or a flowing current) applied to the transistor to reproduce color. The first DDI 1464 may include a gate driver circuit part, which has an on & off function and controls gates of the sub-pixels (RGB), and a source driver circuit part, which regulates image signals of the sub-pixels (RGB) to produce differential colors. The first DDI 1464 may regulate the transistors of the sub-pixels of the first panel 1462 and may configure the entire screen. The first DDI 1464 may receive first image data from the processor 1410 such that a video or an image is displayed on the first panel 1462.

The second display 1465 may include a second panel 1466 and a second DDI 1468 configured to control the second panel 1466. The second panel 1466 may have a plurality of pixels which include sub-pixels that display the RGB colors representing three primary colors of light. Each of the sub-pixels may include at least one transistor, and may be regulated based on the intensity of a voltage (or a flowing current) applied to the transistor to reproduce color. The second DDI 1468 may include a gate driver circuit part, which has an on & off function and controls gates of the sub-pixels, and a source driver circuit part, which regulates image signals of the sub-pixels to produce differential colors. Accordingly, the second DDI 1468 may regulate the transistors of the sub-pixels of the second panel 1466 and may configure the entire screen. The second DDI 1468 may receive second image data the same as or different from the first image data from the processor 1410 such that a video or an image is displayed on the second panel 1466.

According to embodiments, at least one of the first panel 1462 and the second panel 1466 may be implemented to have a flat, flexible, or bendable surface. At least one of the first panel 1462 or the second panel 1466 may include one or more modules including the touch panel 1452 and/or the pen sensor 1454.

The interface 1470 may include a high-definition multimedia interface (HDMI) 1472, a universal serial bus (USB) 1474, an optical interface 1476, and a D-subminiature (D-sub) 1478, may be included in the communication interface 1370 illustrated in FIG. 13 and may include a mobile high definition link (MHL) interface, a SD card/multi-media card (MMC) interface, or an infrared data association (IrDA) standard interface.

The audio module 1480 may convert a sound and an electric signal in dual directions. At least a part of the audio module 1480 may be included in the input/output interface 1350 illustrated in FIG. 13. The audio module 1480 may process sound information that is input or output through a speaker 1482, a receiver 1484, an earphone 1486, or the microphone 1488. The camera module 1491 for shooting a still image or a video may include at least one image sensor, such as a front sensor or a rear sensor, a lens, an image signal processor (ISP), or a flash, such as an LED or a xenon lamp. The power management module 1495 may manage power of the electronic device 1401. According to an embodiment, a power management integrated circuit (PMIC), a charger IC, or a battery gauge may be included in the power management module 1495. The PMIC may have a wired charging method and/or a wireless charging method. The wireless charging method may include a magnetic resonance method, a magnetic induction method or an electromagnetic method and may further include an additional circuit a coil loop, a resonant circuit, or a rectifier. The battery gauge may measure a remaining capacity of the battery 1496 and a voltage, current or temperature thereof while the battery is charged. The battery 1496 may include a rechargeable battery and/or a solar battery.

The indicator 1497 may display a specific state of the electronic device 1401 or the processor 1410, such as a booting, message, or charging state. The motor 1498 may convert an electrical signal into a mechanical vibration and may generate vibration and haptic effects. A processing device for supporting a mobile TV may be included in the electronic device 1401, and may process media data according to the standards of digital multimedia broadcasting (DMB), digital video broadcasting (DVB), or MediaFlo™, for example. Each of the above-mentioned elements of the electronic device according to embodiments of the present disclosure may be configured with one or more components, and the names of the elements may be changed according to the type of the electronic device. The electronic device may omit some elements or may further include additional elements. Some of the elements of the electronic device may be combined with each other so as to form one entity, so that the functions of the elements may be performed in the same manner as before the combination.

Figure 15:
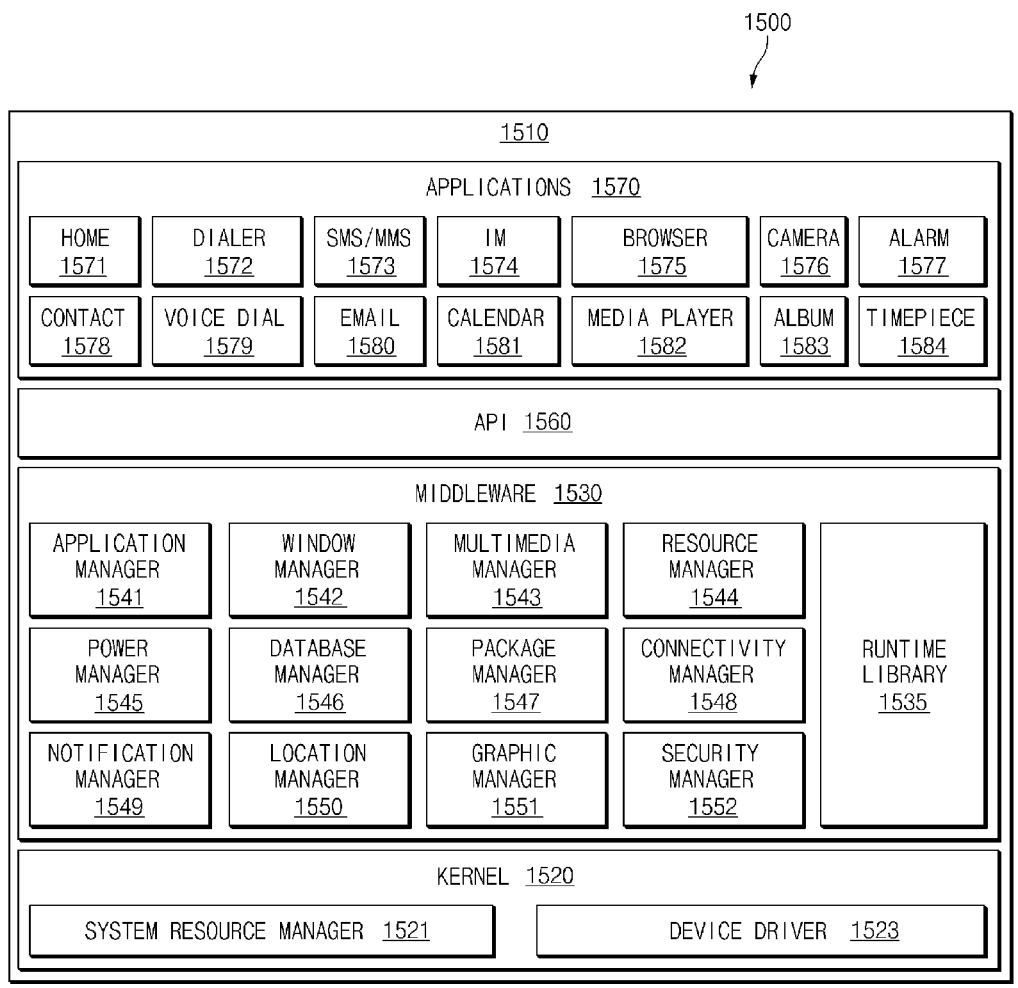
FIG. 15 illustrates a block diagram of a program module, according to embodiments of the present disclosure.

FIG. 15 illustrates a block diagram of a program module, according to embodiments of the present disclosure.

In FIG. 15, a program module 1510 may include an OS to control resources associated with an electronic device, and/or diverse applications driven on the OS. The OS may be Android, iOS, Windows, Symbian, Tizen, or Samsung bada OS.

The program module 1510 may include a kernel 1520, a middleware 1530, an application programming interface (API) 1560, and/or applications 1570. At least a portion of the program module 1510 may be preloaded on an electronic device or may be downloadable from an external electronic device.

The kernel 1520 may include a system resource manager 1521 or a device driver 1523. The system resource manager 1521 may perform control, allocation, or retrieval of system resources. According to an embodiment, the system resource manager 1521 may include a process managing unit, a memory managing unit, or a file system managing unit. The device driver 1523 may include a display driver, a camera driver, a Bluetooth driver, a shared memory driver, a USB driver, a keypad driver, a Wi-Fi driver, an audio driver, or an inter-process communication (IPC) driver.

The display driver may control at least one or more displayer driver ICs (DDI) and include functions for controlling a screen according to a request from the applications 1570.

The middleware 1530 may provide a function that the applications 1570 need in common, or may provide diverse functions to the applications 1570 through the API 1560 to allow the applications 1570 to efficiently use limited system resources of the electronic device. According to an embodiment, the middleware 1530 may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535 may include a library module that is used by a compiler to add a new function through a programming language while at least one of the applications 1570 is being executed, and may perform input/output management, memory management, or capacities about arithmetic functions.

The application manager 1541 may manage a life cycle of at least one application of the applications 1570. The window manager 1542 may manage a GUI resource that is used in a screen. For example, when two or more displays 1460 are connected each other, the window manager 1542 may configure or manage the screen in several ways based on a screen ratio or an operation of at least one of the applications 1570. The multimedia manager 1543 may identify a format necessary for playing diverse media files, and may perform encoding or decoding of media files by using a codec suitable for the format. The resource manager 1544 may manage resources such as a storage space, memory, or source code of at least one application of the applications 1570.

The power manager 1545 may operate with a basic input/output system (BIOS) to manage a battery or power, and may provide power information for an operation of an electronic device. The database manager 1546 may generate, search for, or modify database that is to be used in at least one of the applications 1570. The package manager 1547 may install or update an application that is distributed in the form of package file.

The connectivity manager 1548 may manage wireless connection such as Wi-Fi or Bluetooth. The notification manager 1549 may display or notify an event such as arrival message, appointment, or proximity notification in a mode that does not disturb a user. The location manager 1550 may manage location information about an electronic device. The graphic manager 1551 may manage a graphic effect that is provided to a user, or manage a user interface relevant thereto. The security manager 1552 may provide a general security function necessary for system security or user authentication. When an electronic device includes a telephony function, the middleware 1530 may further includes a telephony manager for managing a voice or video call function of the electronic device.

The middleware 1530 may include a middleware module that combines diverse functions of the above-described elements, and may provide a module specialized to each OS type to provide differentiated functions, and may dynamically remove a part of the preexisting elements or may add new elements thereto.

The API 1560 may be a set of programming functions and may be provided with a configuration that is variable depending on an OS. For example, when the OS is Android or iOS, it may be permissible to provide one API set per platform. When an OS is Tizen, it may be permissible to provide at least two API sets per platform.

The applications 1570 may provide functions for a home 1571, a dialer 1572, a short message service/multimedia messaging service (SMS/MMS) 1573, an instant message (IM) 1574, a browser 1575, a camera 1576, an alarm 1577, a contact 1578, a voice dial 1579, an e-mail 1580, a calendar 1581, a media player 1582, an album 1583, and a timepiece 1584, or for offering health care, such as measuring an exercise quantity or blood sugar, or environment information, such as atmospheric pressure, humidity, or temperature.

According to an embodiment, the applications 1570 may include an information exchanging application to support information exchange between an electronic device and an external electronic device. The information exchanging application may include a notification relay application for transmitting specific information to an external electronic device, or a device management application for managing the external electronic device.

For example, the notification relay application may include a function of transmitting notification information, which arises from other applications, to an external electronic device, and may receive notification information from an external electronic device and provide the notification information to a user.

The device management application may install, delete, or update at least one function of the external electronic device which communicates with the electronic device, an application running in the external electronic device, or a service, such as a call or message service provided from the external electronic device.

According to an embodiment, the applications 1570 may include an application, such as a health care application of a mobile medical device that is assigned in accordance with an attribute of an external electronic device. The applications 1570 may include an application that is received from an external electronic device, and a preloaded application or a third party application that is downloadable from a server. The element titles of the program module 1510 may be modifiable depending on types of operating systems.

At least a portion of the program module 1510 may be implemented by software, firmware, hardware, or a combination of two or more thereof At least a portion of the program module 1510 may be executed by the processor. At least a portion of the program module 1510 may include modules, programs, routines, sets of instructions, processes, or the like for performing one or more functions.

The term "module" used in the present disclosure may represent a unit including one or more combinations of hardware, software and firmware, may be interchangeably used with the terms "unit", "logic", "logical block", "component" and "circuit", may be a minimum unit of an integrated component or may be a part thereof or a minimum unit for performing one or more functions or a part thereof, and may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus or a method according to embodiments may be implemented by instructions stored in a computer-readable storage media in the form of a program module. The instruction, when executed by a processor, may cause the one or more processors to perform a function corresponding to the instruction. The computer-readable storage media may be the memory 1330.

A computer-readable recording medium may include a hard disk, a floppy disk, a magnetic media, an optical media, such as a compact disc read only memory (CD-ROM) and a digital versatile disc (DVD), a magneto-optical media, such as a floptical disk), and hardware devices, such as a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to embodiments may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Other operations may be added.

Figure 16:
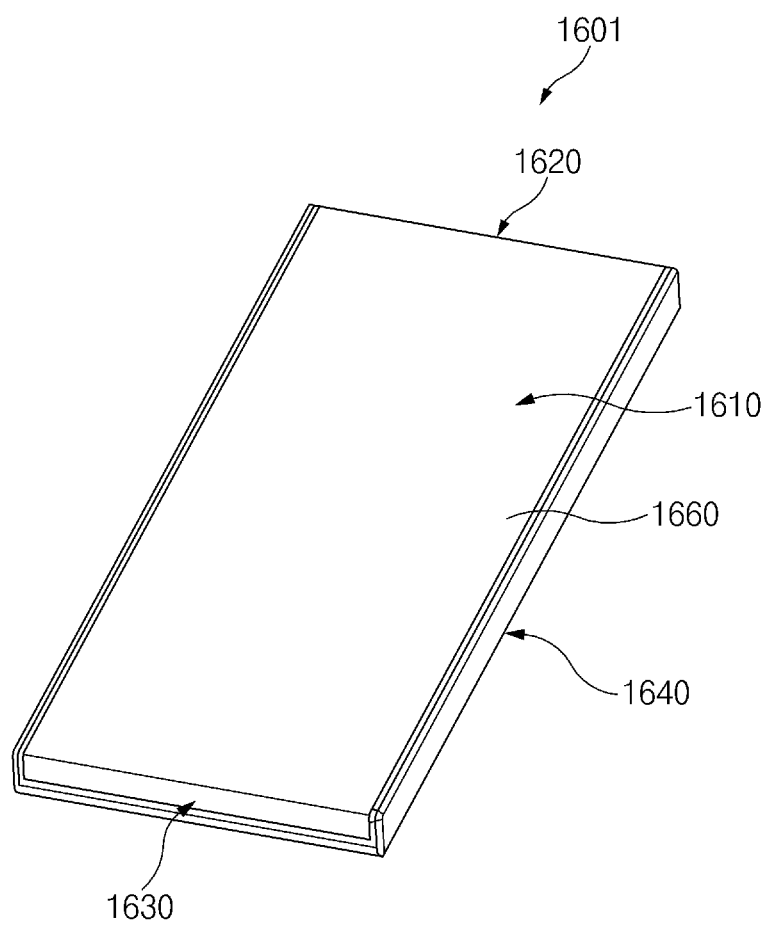
FIG. 16 illustrates a perspective view of an electronic device, according to embodiments of the present disclosure.

FIG. 16 illustrates a perspective view of an electronic device, according to embodiments of the present disclosure.

As illustrated in FIG. 16, an electronic device 1601 may include a first surface 1610, a second surface 1620, a third surface 1630, and a fourth surface 1640. The first surface 1610 may be a front surface of the electronic device 1601. Each of the second surface 1620 and the third surface 1630 may be a side surface of the electronic device 1601, and may be any one of surfaces interposed between the first surface 1610 and the fourth surface 1640. Although FIG. 16 illustrates that each of the second surface 1620 and the third surface 1630 has a shorter length in the electronic device 1601, the present disclosure is not limited thereto. For example, each of the second surface 1620 and the third surface 1630 may be a side surface having a longer length in the electronic device 1601. The fourth surface 1640 may be a rear surface of the electronic device 1601. The display 1360 may be disposed on at least one of the first surface 1610, the second surface 1620, the third surface 1630, and the fourth surface 1640.

According to an embodiment, the display 1360 may be disposed on the first surface 1610, the second surface 1620, and the third surface 1630 in the electronic device 1601. One display 1360 may be disposed on the entire portion of the first surface 1610. The display 1360 may be disposed on the entire portion of the first surface 1610 as a hole for another component (e.g. a camera or a sensor) of the electronic device 1601 or a physical button is omitted from the first surface 1610. The display 1360 may be disposed while being expanded from the first surface 1610 to the second surface 1620 and the third surface 1630. The flexible display 1360 may be bent toward the second surface 1620 and the third surface 1630. The electronic device 1601 may include the display 1360 having the structure in which a non-display region of a screen is not completely removed. For example, the electronic device 1601 may include a black matrix (BM) area, a portion of which has a width in the range of 0.1 mm to 1 mm, at least another portion of which has a width in the range of 1 mm to 5 mm, in the non-display region of the screen.

Figure 17:
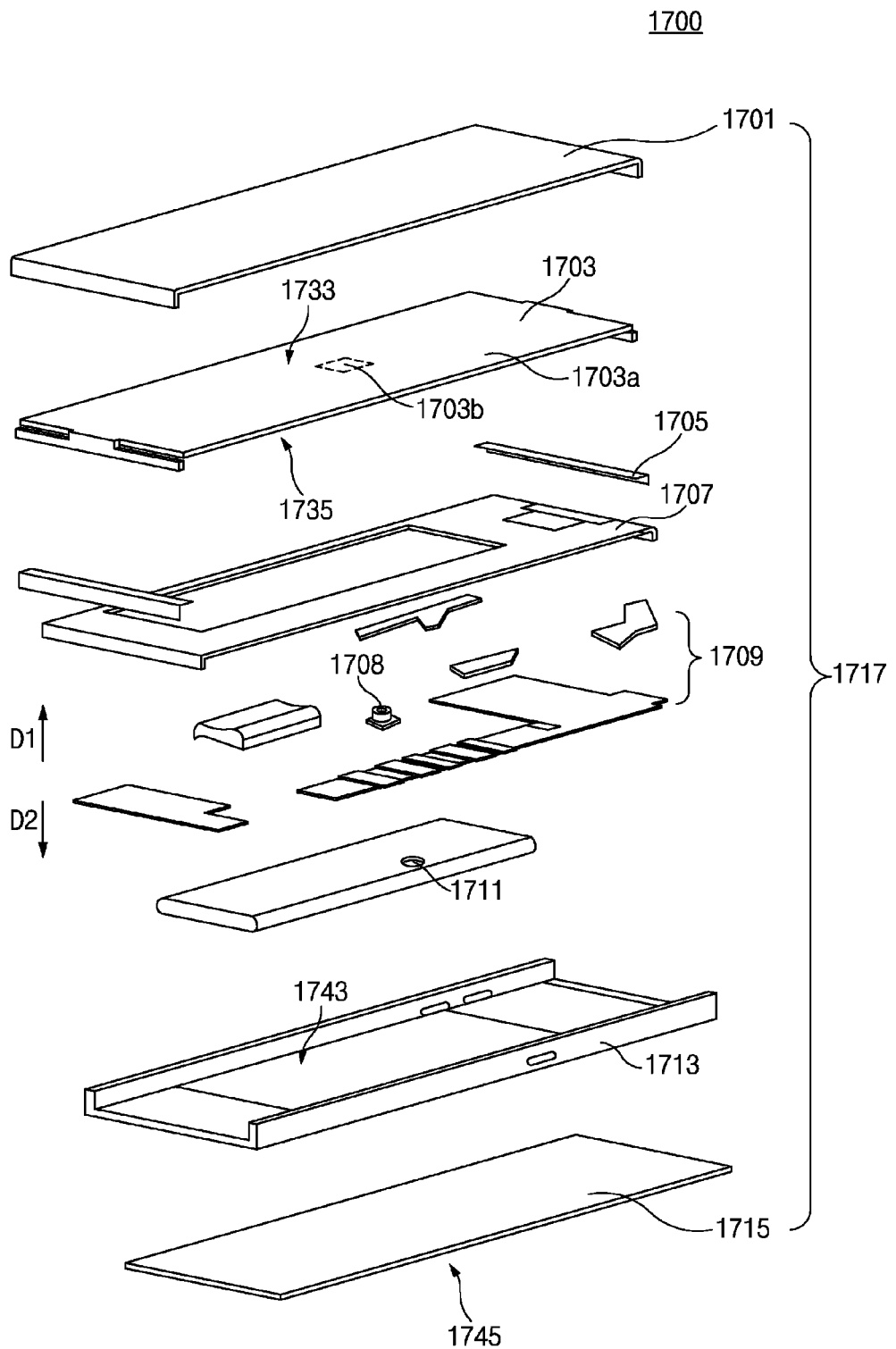
FIG. 17 illustrates an exploded perspective view of an electronic device, according to embodiments of the present disclosure.

FIG. 17 illustrates an exploded perspective view of an electronic device, according to embodiments of the present disclosure.

As illustrated in FIG. 17, an electronic device 1700 may include a transparent plate 1701, a display 1703, an FPCB 1705, a bracket 1707, a panel board assembly (PBA) 1709, a battery 1711, a camera device 1708, and a housing 1717.

The transparent plate 1701 may be disposed at an upper portion of the electronic device 1700, may protect various elements disposed under the transparent plate 1701, and may transmit inner light, which is generated from an inner portion of the electronic device 1700, to the outside. In addition, the transparent plate 1701 may transmit external light, which is incident thereto from an outside of the electronic device 1700, into the electronic device 1700. The transparent plate 1701 may be formed of a material that enables significant light transmittance, heat resistance, chemical resistance, and mechanical strength. In this case, the transparent plate 1701 may be a transparent film including polyethylene terephthalate or a glass substrate. In addition, the transparent plate 1701 may be a plastic substrate including polymethylmethacrylate, polyamide, polyimide, polypropylene, or polyurethane, for example.

According to embodiments, the transparent plate 1701 may further include a touch panel which senses a touch made on the surface of the transparent plate 1701, and may use at least one of capacitive, resistive, infrared or ultrasonic detecting manners to sense the touch.

For example, as the transparent plate 1701 may be configured at the upper portion of the electronic device 1700 to protect internal elements of the electronic device 1700, the transparent plate 1701 may constitute a portion of the housing 1717.

The housing 1717 may include a first surface 1743 and a second surface 1745. The first surface 1743 may be a surface facing a first direction D1. The second surface 1745 may be a surface facing a second direction D2 opposite to the first direction D1. The transparent plate 1701 may form at least a portion of the first surface 1743 of the housing 1717, thereby constituting a portion of the housing 1717.

The display 1703 may be configured corresponding to the display 1360 described above with reference to FIG. 13. The display 1703 may be interposed between the transparent plate 1701 and the second surface 1745 of the housing 1717, may include a first surface 1733 facing the first direction D1 and a second surface 1735 facing the second direction D2, and may act as an internal element of the electronic device 1700 and may display an image.

The display 1703 may include a first region 1703a and a second region 1703b. The first region 1703a may be an area, at least a portion of which does not overlap at least one sensor, when viewed from the top of the transparent plate 1701. The second region 1703b may be a region, at least a portion of which overlaps at least one sensor, when viewed from the top of the transparent plate 1701. The first region 1703a may be the central region of the display 1703. In other words, the camera device 1708 may be disposed in the center of the electronic device 1700. Although FIG. 17 illustrates that a sensor is the camera device 1708, the present disclosure is not limited thereto. Accordingly, various sensors, such as a proximity, illuminance, fingerprint, or biometric sensor, may be disposed in addition to the camera device 1708.

The FPCB 1705 may be electrically connected with various elements including the display 1703, and may apply a signal to the display 1703 or may receive a signal from the display 1703. The bracket 1707 may be used to affix the PBA 1709 and the battery 1711 thereto. The PBA 1709 may include a PCB and a connector, and may be electrically connected with embodiments including the display 1703. The battery 1711 may be used to manage the power of the electronic device 1700.

The housing 1717 may include the transparent plate 1701, a frame mold 1713, and a back cover 1715. The frame mold 1713 may be used to fix internal elements of the electronic device 1700, may receive the display 1703, the FPCB 1705, the bracket 1707, the PBA 1709, and the battery 1711 and fix the elements thereto, may be implemented in the structure of protecting internal elements of the display 1703, and may be formed of synthetic resin or a metallic material such as stainless steel or titanium (Ti). The back cover 1715 may be disposed on the rear surface of the electronic device 1700 to prevent the internal elements from being recognized, and may include various films.

Figure 18:
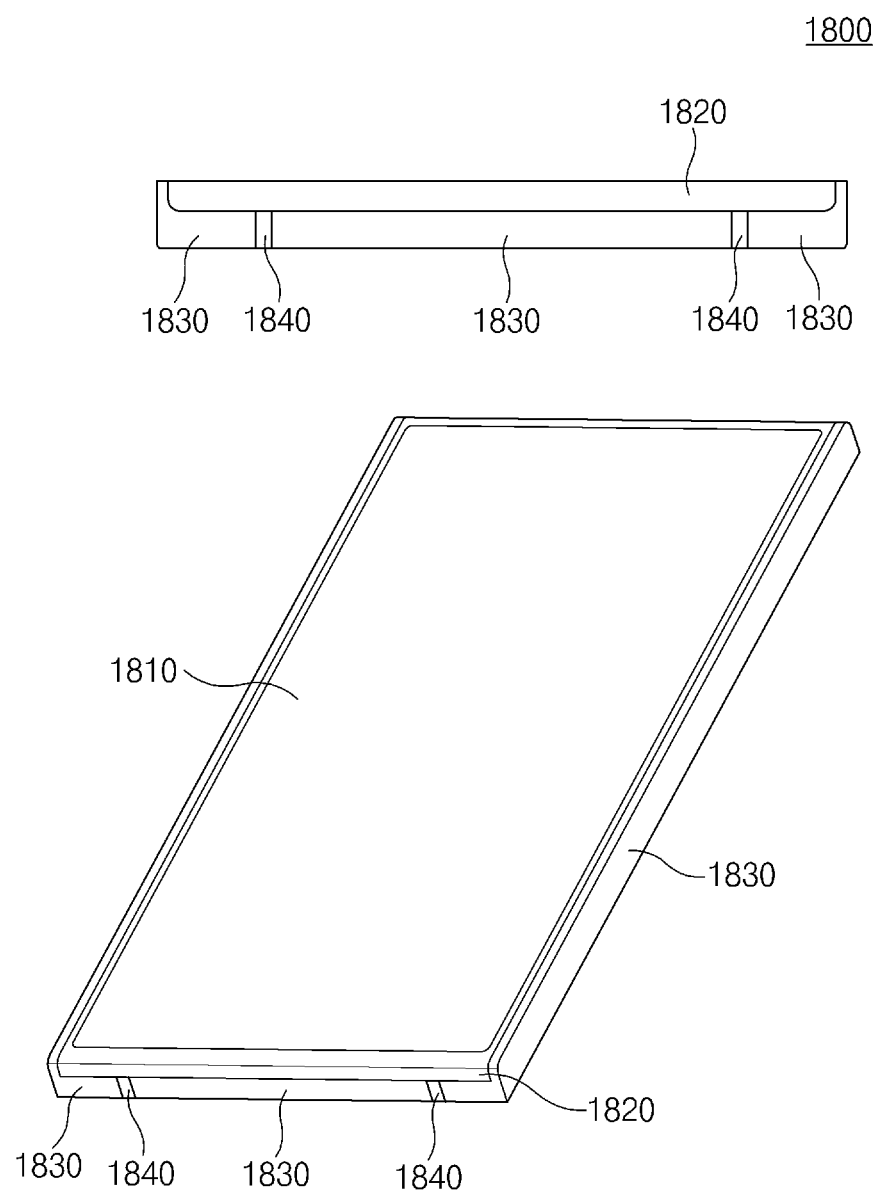
FIG. 18 illustrates a perspective view and a side view of an electronic device, according to embodiments of the present disclosure.

FIG. 18 illustrates a perspective view and a side view of an electronic device, according to embodiments of the present disclosure.

Referring to FIG. 18, an electronic device 1800 may include a display 1810, a non-conductive member 1820, an antenna radiator 1830, and slit parts 1840.

The display 1810 may occupy the front surface of an electronic device 1800 at an occupancy rate higher than that of a typical panel. For example, the display 1810 may be a full front panel which occupies the entire front surface of a housing in the electronic device 1800. The display 1810 may be formed of a conductive material. Since the display 1810 is formed of the conductive material, if the display 1810 is enlarged to be adjacent to an antenna, the display 1810 affects the performance of the antenna.

A side housing of the electronic device 1800 may include the non-conductive member 1820, the antenna radiator 1830, and the slit parts 1840.

The non-conductive member 1820 may form a portion of the side housing of the electronic device 1800. The non-conductive member 1820 may be disposed to laterally surround at least a portion of the display 1810. For example, the non-conductive member 1820 may be disposed to physically contact a side surface of the display 1810. The non-conductive member 1820 may be an injection-molded member or a glass cover of the electronic device 1800. The distance between the display 1810 and the antenna radiator 1830 may be solidified by the non-conductive member 1820 which surrounds the display 1810.

The antenna radiator 1830 may form a portion of the side housing of the electronic device 1800, may be disposed under the non-conductive member 1820, and may physically contact the non-conductive member 1820 in a layer-wise direction. Since the antenna radiator 1830 is disposed under the non-conductive member 1820 which surrounds the display 1810, the antenna radiator 1830 may be spaced apart from the display 1810 layer-wise. The antenna radiator 1830 may be segmented into a plurality of radiators by the slit parts 1840.

The slit parts 1840 may form portions of the side housing of the electronic device 1800. Each of the slit parts 1840 may electrically insulate the radiators from each other, may be interposed between the segmented radiators, may physically contact the non-conductive member 1820 layer-wise, and may be formed of non-conductive materials.

Figure 19:
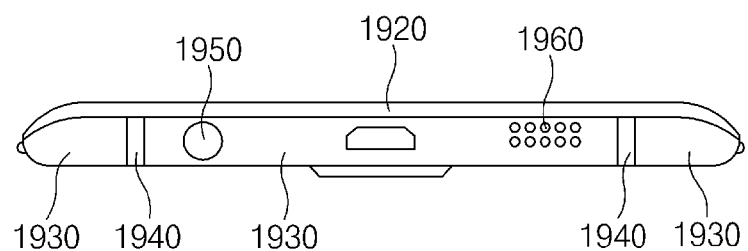
FIG. 19 illustrates a perspective view and a side view of an electronic device, according to embodiments of the present disclosure.
Figure 19:
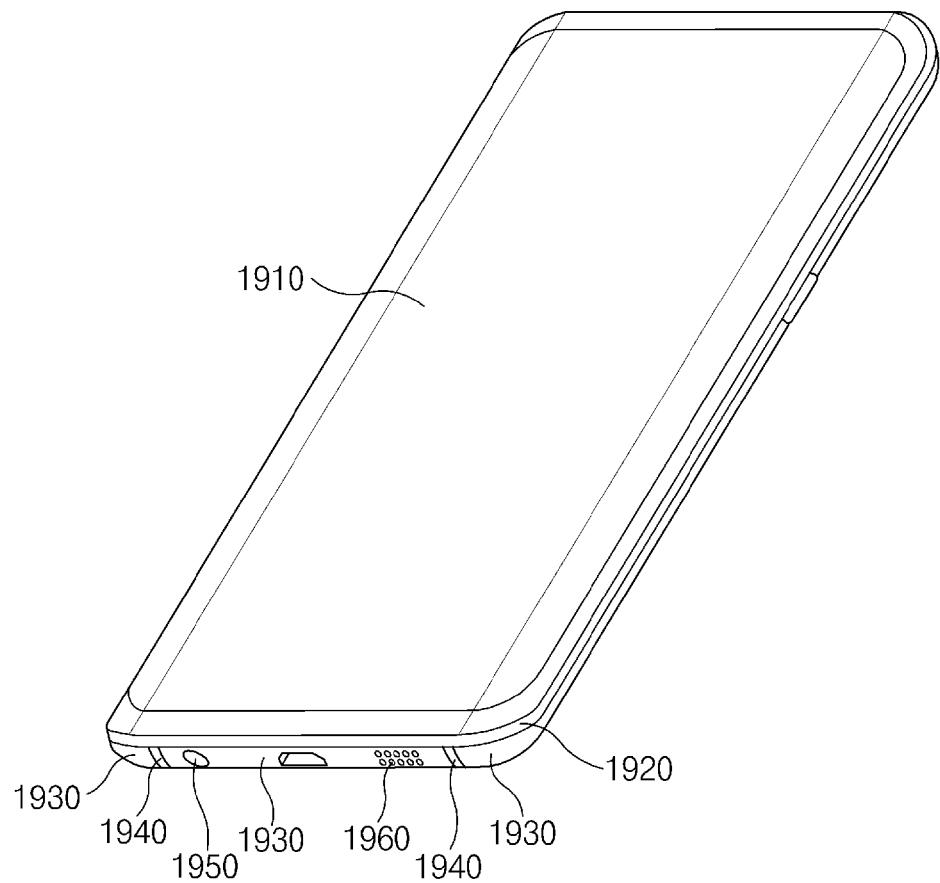

FIG. 19 illustrates a perspective view and a side view of an electronic device, according to embodiments of the present disclosure.

Referring to FIG. 19, an electronic device 1900 may include a display 1910, a non-conductive member 1920, antenna radiators 1930, and slit parts 1940.

The display 1910 may be a curved display having a flat central portion and a curved peripheral portion. For example, a left-side end and a right-side end of the display 1910 may be rounded.

A side housing of the electronic device 1900 may include the non-conductive member 1920, the antenna radiators 1930, and the slit parts 1940. Considering the layers of the side housing, a left-side portion and a right-side portion may be thinner than a central portion.

The non-conductive member 1920 may form a portion of the side housing of the electronic device 1900, and may be disposed to laterally surround at least a portion of the display 1910. The non-conductive member 1920 may be disposed in the structure curved along the display 1910, and may be an injection-molded member.

The antenna radiators 1930 may form portions of the side housing of the electronic device 1900, and may be disposed under the non-conductive member 1920. Layer-wise a left-side portion and a right-side portion of the antenna radiator 1930 may be thinner than a central portion of the antenna radiator 1930.

The slit parts 1940 may form portions of the side housing of the electronic device 1900, and may electrically insulate the antenna radiators 1930 from each other. For example, the slit parts 1940 may be disposed in a left side of an ear jack 1950 of the electronic device 1900 and a right side of a speaker 1960.

Figure 20:
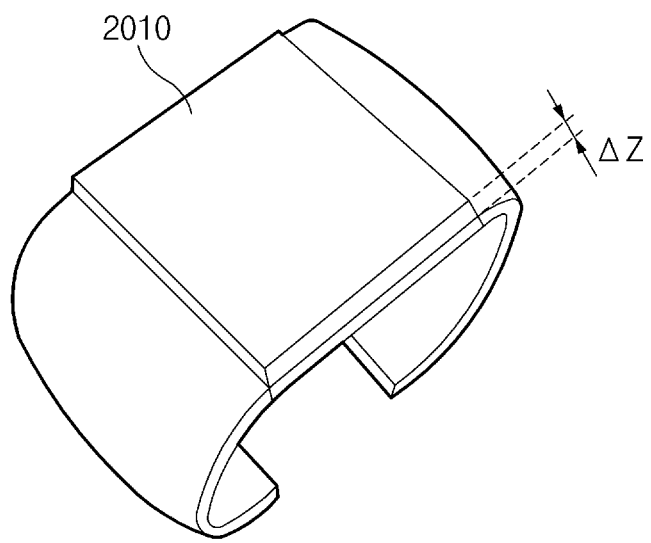
FIG. 20 illustrates a perspective view of an electronic device, according to embodiments of the present disclosure.
Figure 20:
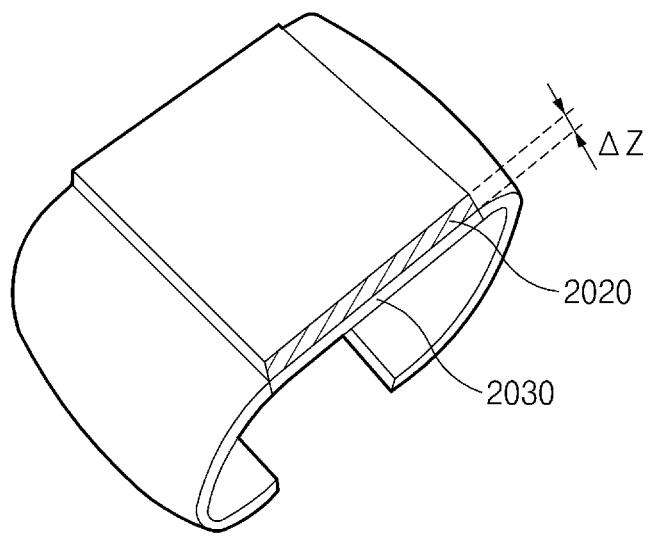

FIG. 20 illustrates a perspective view of an electronic device, according to embodiments of the present disclosure.

Referring to FIG. 20, an electronic device 2000 may be a wearable device, such as a smart watch, and may include a glass cover 2010, an antenna radiator 2030, and a non-conductive member 2020.

The electronic device 2000 may be configured such that a distance $\Delta z$ between a front surface of the electronic device 2000 and the antenna radiator 2030 is solidified and thus the performance of the antenna radiator 2030 is prevented from being degraded. For example, the glass cover 2010 of the electronic device 2000 may extend along a side surface of the electronic device 2000 such that the antenna radiator 2030 is spaced apart from the display layer-wise of the electronic device 2000.

Alternatively, the electronic device 2000 may further include the non-conductive member 2020, which surrounds the glass cover 2010, such that the antenna radiator 2030 is spaced apart layer-wise from the display of the electronic device 2000. The non-conductive member 2020 may be disposed to surround the glass cover 2010 and the display and may be adjacent to the antenna radiator 2030 layer-wise. The non-conductive member 2020 may be formed of a material for forming the non-conductive member 2020 through injection-molding.

According to embodiments of the present disclosure, the distance between the display panel and the antenna radiator may be solidified as the antenna radiator is spaced apart from the display panel layer-wise, and the performance degradation of the antenna is prevented as the display panel is expanded.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing including a first surface facing a first direction, a second surface facing a second direction opposite to the first direction, and a side surface surrounding a space between the first surface and the second surface;
   a touch screen display including a screen exposed through the first surface, wherein the touch screen display includes a conductive plane which is substantially parallel with the first surface;
   a printed circuit board positioned between the touch screen display and the second surface and being substantially parallel with the conductive plane;
   a wireless communication circuit positioned on the printed circuit board; and
   a side member forming at least a portion of the side surface,
   wherein the side member includes:
   a first elongated part that surrounds at least a portion of the conductive plane and is formed of a non-conductive material; and
   a second elongated part surrounding at least a portion of the printed circuit board and substantially none of the conductive plane, and extending in parallel with the first elongated part,
   wherein the second elongated part is formed of a conductive material, and wherein the second elongated part is electrically coupled to the wireless communication circuit.

2. The electronic device of claim 1, wherein the first surface includes a first side having a first length, a second side having a second length longer than the first length, a third side having the first length, and a fourth side having the second length, wherein the first side is parallel with the third side and is perpendicular to the second side and the fourth side, and
   wherein the side member extends along at least one of the first side or the third side.

3. The electronic device of claim 1, wherein the side member includes an inner surface facing a third direction different from the first direction and the second direction, wherein the printed circuit board includes a peripheral surface facing a fourth direction different from the first direction, the second direction, and the third direction, and wherein the electronic device further includes a conductive connecting member electrically coupled between the inner surface of the side member and the peripheral surface of the printed circuit board.

4. The electronic device of claim 3, wherein the conductive connecting member includes at least one of a flexible conductive connector and a rigid conductive connector.

5. The electronic device of claim 1, wherein the conductive plane includes a touch sensing panel.

6. The electronic device of claim 1, further comprising:
at least one slit part which segments a portion of the second elongated part surrounding a top end or a bottom end of the electronic device, and is adjacent to the first elongated part in a layer-wise direction of the electronic device.

7. An electronic device comprising:
a glass cover configured to cover at least a portion of a front surface of the electronic device;
a display panel disposed under the glass cover;
a non-conductive member configured to cover at least a portion of a side surface of the electronic device;
an antenna radiator configured to cover another portion of the side surface of the electronic device;
a printed circuit board disposed under the display panel; and
a wireless communication circuit disposed on the printed circuit board and electrically connected with the antenna radiator,
wherein the non-conductive member is adjacent to the glass cover and is disposed to laterally surround at least a portion of the display panel, and
wherein the antenna radiator is disposed under the non-conductive member, is spaced apart from the display panel in a layer-wise direction, and is electrically connected with the printed circuit board.

8. The electronic device of claim 7, wherein the glass cover is formed integrally with the non-conductive member.

9. The electronic device of claim 8, further comprising:
a buffer member interposed between the non-conductive member and the antenna radiator.

10. The electronic device of claim 7, further comprising:
at least one slit part which segments the antenna radiator into a plurality of radiators,
wherein each of the plurality of radiators is electrically connected with at least one feeding unit and at least one ground unit.

11. The electronic device of claim 7, further comprising:
a metallic sheet disposed under the display panel;
a first connecting member configured to electrically connect the metallic sheet with the antenna radiator; and
a second connecting member configured to electrically connect the metallic sheet with the antenna radiator at a position different from a position of the first connecting member,
wherein the metallic sheet, the first connecting member, the antenna radiator, and the second connecting member form an electrical path for radiating or receiving a radio frequency signal.

12. The electronic device of claim 7, wherein the antenna radiator is spaced apart from the display panel in a width-wise direction and a length-wise direction.

13. The electronic device of claim 7, further comprising:
a conductive connecting member that contacts the printed circuit board and is inserted into a groove formed in a portion of the antenna radiator, which is adjacent to the printed circuit board,
wherein the conductive connecting member is disposed on an electrical path between the wireless communication circuit and the antenna radiator.

14. The electronic device of claim 13, wherein the conductive connecting member includes a first end portion that contacts the printed circuit board and a second end portion that contacts the antenna radiator, and
wherein an area of the second end portion is narrower than an area of the first end portion.

15. The electronic device of claim 7, wherein a portion of the printed circuit board adjacent to the antenna radiator has an L shape,
wherein the electronic device further includes a conductive connecting member that contacts the printed circuit board and an inner surface of the antenna radiator, and
wherein the conductive connecting member is disposed on an electrical path between the wireless communication circuit and the antenna radiator.

16. The electronic device of claim 7, wherein the printed circuit board laterally contacts the antenna radiator,
wherein a portion of the printed circuit board adjacent to the antenna radiator has an L shape,
wherein the electronic device further includes a conductive connecting member inserted into a groove formed in the antenna radiator through the printed circuit board, and
wherein the conductive connecting member is disposed on an electrical path between the wireless communication circuit and the antenna radiator.

17. The electronic device of claim 7, wherein the antenna radiator is electrically connected with a feeding unit and a ground unit,
wherein the display panel includes a first region and a second region,
wherein the first region is wider than the second region, and
wherein the second region extends along a portion of an electrical path between the feeding unit and the ground unit, the portion of the electrical path being shorter than a specified distance from the second display panel.

18. An electronic device comprising:
a glass cover configured to cover a front surface and at least a first portion of a side surface of the electronic device;
a display panel disposed under the glass cover;
an antenna radiator configured to cover a second portion of the side surface
a printed circuit board disposed under the display panel; and
a wireless communication circuit disposed on the printed circuit board and electrically connected with the antenna radiator,
wherein the antenna radiator is disposed under the glass cover, is spaced apart from the display panel in a layer-wise direction, and is electrically connected with the printed circuit board.

19. The electronic device of claim 18, further comprising:
a buffer member interposed between the glass cover and the antenna radiator.

20. The electronic device of claim 18, wherein the display panel is curved, and
wherein the glass cover is curved along the display panel.

* * * * *